(12) United States Patent
Takahashi et al.

(10) Patent No.: US 11,472,199 B2
(45) Date of Patent: Oct. 18, 2022

(54) INKJET PRINTING APPARATUS, INKJET PRINTING METHOD, AND METHOD FOR CONTROLLING GLOSSINESS OF PRINT IMAGE

(71) Applicant: RICOH COMPANY, LTD., Tokyo (JP)

(72) Inventors: Hiroaki Takahashi, Kanagawa (JP); Akiko Bannai, Kanagawa (JP); Kiminori Masuda, Tokyo (JP); Yukiko Takamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 70 days.

(21) Appl. No.: 17/110,494

(22) Filed: Dec. 3, 2020

(65) Prior Publication Data

US 2021/0170778 A1 Jun. 10, 2021

(30) Foreign Application Priority Data

Dec. 6, 2019 (JP) .............................. JP2019-221077

(51) Int. Cl.
*B41M 7/00* (2006.01)
*B41J 11/00* (2006.01)
(Continued)

(52) U.S. Cl.
CPC .............. *B41J 11/002* (2013.01); *B41J 2/01* (2013.01); *B41J 11/0021* (2021.01);
(Continued)

(58) Field of Classification Search
CPC .... B41M 7/009; B41J 11/002; B41J 11/0021; B41J 11/0022; B41J 11/0024; B41J 2/01;
(Continued)

(56) References Cited

U.S. PATENT DOCUMENTS

2006/0100307 A1 5/2006 Uerz et al.
2014/0375720 A1 12/2014 Sato et al.
(Continued)

FOREIGN PATENT DOCUMENTS

JP 2008-519868 6/2008
JP 2011-105899 6/2011
(Continued)

OTHER PUBLICATIONS

U.S. Appl. No. 16/869,103, filed May 7, 2020.

*Primary Examiner* — Matthew Luu
*Assistant Examiner* — Kendrick X Liu
(74) *Attorney, Agent, or Firm* — Grüneberg and Myers PLLC

(57) ABSTRACT

Inkjet printing apparatus including: ink accommodating unit storing ink; ejection head configured to eject the ink to form print layer; and heating unit configured to heat print target, wherein the ink is clear ink including resin and water, dry film of the clear ink has glass transition temperature of 50° C. or more, the inkjet printing apparatus has first printing mode and second printing mode, and the heating unit is configured to heat the print target so that expression: $T_{matte} > T_{gloss}$ is satisfied, where the $T_{matte}$ is temperature (° C.) of the print target in printing region printed in the first printing mode obtained when the clear ink is deposited on the print target, and the $T_{gloss}$ is temperature (° C.) of the print target in printing region printed in the second printing mode obtained when the clear ink is deposited on the print target.

11 Claims, 2 Drawing Sheets

210 heater before printing
211 heater during printing
212 heater after printing

(51) Int. Cl.
  *B41J 2/01* (2006.01)
  *C09D 11/023* (2014.01)
  *C09D 11/102* (2014.01)
  *C09D 11/30* (2014.01)
  *C09D 11/033* (2014.01)

(52) U.S. Cl.
  CPC ........ *B41J 11/0022* (2021.01); *B41J 11/0024* (2021.01); *B41M 7/009* (2013.01); *C09D 11/023* (2013.01); *C09D 11/033* (2013.01); *C09D 11/102* (2013.01); *C09D 11/30* (2013.01)

(58) Field of Classification Search
  CPC ..... C09D 11/023; C09D 11/10; C09D 11/102; C09D 11/30
  See application file for complete search history.

(56) References Cited

U.S. PATENT DOCUMENTS

| | | | |
|---|---|---|---|
| 2016/0096379 | A1* | 4/2016 | Wetjens .............. B41J 11/0021 347/16 |
| 2019/0038181 | A1 | 12/2019 | Takahashi et al. |
| 2019/0381811 | A1 | 12/2019 | Masuda et al. |
| 2020/0114660 | A1* | 4/2020 | Otani .................. B41J 11/0024 |
| 2020/0171832 | A1 | 6/2020 | Akima et al. |
| 2020/0171839 | A1 | 6/2020 | Takahashi et al. |
| 2021/0062029 | A1* | 3/2021 | Seguchi .................... B41J 2/01 |

FOREIGN PATENT DOCUMENTS

| | | |
|---|---|---|
| JP | 2015-003397 | 1/2015 |
| JP | 2016-530119 | 9/2016 |
| JP | 2019-217760 | 12/2019 |

\* cited by examiner 210  heater before printing
211  heater during printing
212  heater after printing

INKJET PRINTING APPARATUS, INKJET PRINTING METHOD, AND METHOD FOR CONTROLLING GLOSSINESS OF PRINT IMAGE

CROSS-REFERENCE TO RELATED APPLICATIONS

The present application claims priority under 35 U.S.C. § 119 to Japanese Patent Application No. 2019-221077 filed Dec. 6, 2019. The contents of which are incorporated herein by reference in their entirety.

BACKGROUND OF THE INVENTION

Field of the Invention

The present disclosure relates to an inkjet printing apparatus, an inkjet printing method, and a method for controlling glossiness of a print image.

Description of the Related Art

In order to improve durability (e.g., lightfastness, water resistance, and abrasion resistance) of wrapping materials for industrial uses (e.g., advertisements and billboards), food, drinks, and daily necessaries, non-permeable print media such as plastic films have been used. Various inks used for such non-permeable print media have been developed.

As such inks, for example, solvent-based inks containing an organic solvent as a solvent and ultraviolet-ray-curable inks containing a polymerizable monomer as a main component have been widely used.

However, regarding the solvent-based inks, an impact on the environment due to evaporation of an organic solvent is concerned. Regarding the ultraviolet-ray-curable inks, options of the polymerizable monomer to be used may be limited in terms of safety.

Therefore, an ink set containing an aqueous ink, which has a low environmental load and can be directly recorded on an impermeable print medium, has been proposed.

Meanwhile, inkjet printing apparatuses having a function of controlling gloss have been developed.

For example, proposed is a liquid jetting device including a liquid jet head capable of jetting an ink including thermoplastic resin particles towards a landing target from a nozzle and a heating unit configured to heat the ink droplets landed on the landing target, where the heating unit configured to perform heating at a filming controlling temperature according to a minimum filming temperature at which the filming of the surface of the ink droplets starts, to thereby control the filming degree of the surface of the ink droplets (see, for example, Japanese Unexamined Patent Application Publication No. 2015-3397).

SUMMARY OF THE INVENTION

According to one aspect of the present disclosure, an inkjet printing apparatus includes: an ink accommodating unit storing an ink; an ejection head configured to eject the ink to form a print layer; and a heating unit configured to heat a print target. The ink is a clear ink including a resin and water. A dry film of the clear ink has a glass transition temperature of 50° C. or more. The inkjet printing apparatus has a first printing mode and a second printing mode. The heating unit is configured to heat the print target so that an expression: $T_{matte} > T_{gloss}$ is satisfied, where the $T_{matte}$ is a temperature (° C.) of the print target in a printing region printed in the first printing mode when the clear ink is deposited on the print target, and the $T_{gloss}$ is a temperature (° C.) of the print target in a printing region printed in the second printing mode obtained when the clear ink is deposited on the print target.

Figure 1:
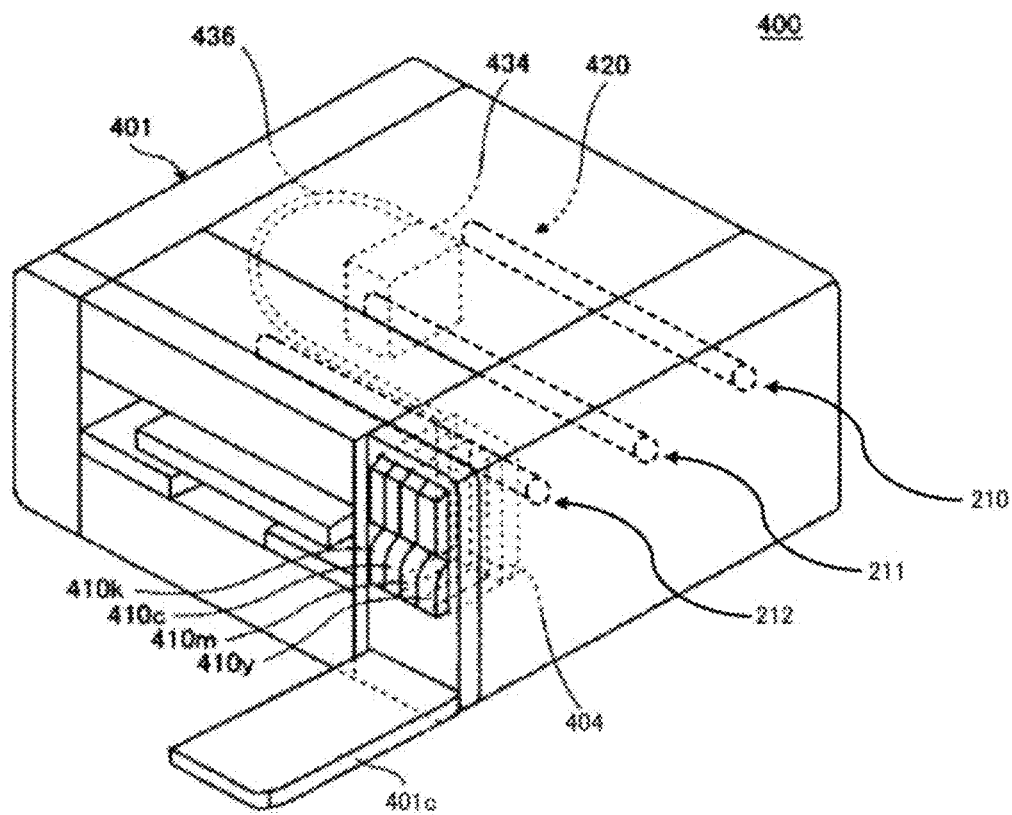
FIG. 1 is a view illustrating an example of an image forming apparatus for carrying out an image forming method of the present disclosure.

DESCRIPTION OF THE EMBODIMENTS (Inkjet Printing Apparatus and Inkjet Printing Method)

In the first embodiment, an inkjet printing apparatus of the present disclosure includes: an ink accommodating unit storing an ink; an ejection head configured to eject the ink to form a print layer; and a heating unit configured to heat a print target. The ink is a clear ink including a resin and water. A dry film of the clear ink has a glass transition temperature of 50° C. or more. The inkjet printing apparatus has a first printing mode and a second printing mode. The heating unit is configured to heat the print target so that an expression: $T_{matte} > T_{gloss}$ is satisfied, where the $T_{matte}$ is a temperature (° C.) of the print target in a printing region printed in the first printing mode when the clear ink is deposited on the print target, and the $T_{gloss}$ is a temperature (° C.) of the print target in a printing region printed in the second printing mode obtained when the clear ink is deposited on the print target. The inkjet printing apparatus of the present disclosure further includes other units if necessary.

In the second embodiment, an inkjet printing apparatus of the present disclosure includes: an ink accommodating unit storing an ink; an ejection head configured to eject the ink to form a print layer; and a heating unit configured to heat a print target. The ink is a clear ink including a resin and water. A dry film of the clear ink has a glass transition temperature of 50° C. or more. The inkjet printing apparatus has a first printing mode and a second printing mode. The heating unit is configured to heat the print target so that an expression: $HT_{matte} > HT_{gloss}$ is satisfied, where the $HT_{matte}$ is a temperature (° C.) of the heating unit in the first printing mode, and the $HT_{gloss}$ is a temperature (° C.) of the heating unit in the second printing mode. The inkjet printing apparatus of the present disclosure further includes other units if necessary.

In the inkjet printing apparatuses of the first embodiment and the second embodiment, the first printing mode may be referred to as a low gloss printing mode that is a printing mode imparting low gloss, and the second printing mode may be referred to as a high gloss printing mode that is a printing mode imparting high gloss.

In the first embodiment, an inkjet printing method of the present disclosure includes: ejecting an ink on a print target to form a print layer; and heating the print target printed. The ink is a clear ink including a resin and water. A dry film of the clear ink has a glass transition temperature of 50° C. or more. The inkjet printing method has a first printing mode and a second printing mode. In the heating, the print target printed is heated so that an expression: $T_{matte} > T_{gloss}$ is satisfied, where the $T_{matte}$ is a temperature (° C.) of the print target in a printing region printed in the first printing mode when the clear ink is deposited on the print target, and the $T_{gloss}$ is a temperature (° C.) of the print target in a printing region printed in the second printing mode obtained when the clear ink is deposited on the print target. The inkjet printing method of the present disclosure further includes other steps if necessary.

In the second embodiment, an inkjet printing method of the present disclosure includes: ejecting the ink on a print target to form a print layer; and heating the print target printed using a heating unit. The ink is a clear ink including a resin and water. A dry film of the clear ink has a glass transition temperature of 50° C. or more. The inkjet printing method has a first printing mode and a second printing mode. An expression: $HT_{matte} > HT_{gloss}$ is satisfied, where the $HT_{matte}$ is a temperature (° C.) of the heating unit in the first printing mode, and the $HT_{gloss}$ (° C.) is a temperature (° C.) of the heating unit in the second printing mode. The inkjet printing method of the present disclosure further includes other steps if necessary.

In the inkjet printing apparatuses of the first embodiment and the second embodiment, the first printing mode may be referred to as a low gloss printing mode that is a printing mode imparting low gloss, and the second printing mode may be referred to as a high gloss printing mode that is a printing mode imparting high gloss.

An object of the present disclosure is to provide an inkjet printing apparatus that can control both gloss types of a matte (low gloss) tone and a gloss (high gloss) tone and can obtain an ink film excellent in abrasion resistance.

According to the present disclosure, it is possible to provide an inkjet printing apparatus that can control both gloss types of a matte (low gloss) tone and a gloss (high gloss) tone and can obtain an ink film excellent in abrasion resistance.

Conventionally, in an inkjet recording apparatus using a clear ink (UV clear ink) cured by irradiation of ultraviolet rays, a gloss controlling method that can control gloss so as to exhibit a matte tone or a gloss tone by controlling irradiation light quantity has been proposed.

However, UV clear inks have problems such as a strong odor, and the odor remains on a printed matter. Therefore, the UV clear inks are not suitable for printed matters for indoor applications. As a result, such an inkjet printing apparatus needs to be installed in an environment where ventilation can be performed, and installation sites are limited. In addition, the UV clear inks require an apparatus for emitting ultraviolet rays, and have problems that the apparatus becomes large and the cost is high.

The inkjet printing apparatus and the inkjet printing method of the present disclosure are based on the following finding. Specifically, in the conventional technique of Japanese Unexamined Patent Application Publication No. 2015-3397, a color ink containing a colorant is used, and a heating unit is used to perform heating at a filming controlling temperature according to a minimum filming temperature at which the filming of the surface of the ink droplets starts, to thereby control the filming degree of the surface of the ink droplets and to adjust the glossiness. However, a color ink containing a colorant cannot obtain a sufficient difference in glossiness and cannot control both gloss types of a matte tone and a gloss tone compared to a clear ink containing no colorant.

The high gloss printing mode is a printing mode that imparts high gloss and makes the surface of a printed matter smooth and highly glossy. The low gloss printing mode is a printing mode that imparts low gloss and results in a printed matter having a low gloss and a matte tone, surface of which has fine irregularities. The high gloss printing mode may be referred to as "gloss printing mode". The low gloss printing mode may be referred to as "matte gloss printing mode".

The inkjet printing apparatus and the inkjet printing method of the present disclosure use a clear ink containing a resin and water, and control both gloss types of a gloss tone and a matte tone by controlling a heating temperature. When a low gloss is imparted, printing is performed at a higher temperature than a printing temperature in the high gloss imparting mode. Because the temperature at the time of printing is high, the clear ink containing the resin prevents dots from being wetted and spread, and prevents adjacent dots from coalescing, to form dots that have dot spheres having a high height (pile height). These dots form irregularities on the surface and impart a low gloss.

Meanwhile, when a high gloss is imparted, printing is performed at a lower temperature than a printing temperature in the low gloss imparting mode. Because the temperature at the time of printing is low, the clear ink containing the resin facilitates wetting and spreading of the dots and coalescence of the adjacent dots, to form a smooth surface and impart a high gloss thereto.

When the clear ink is coated on the color ink, the abrasion resistance of the clear ink film needs to be excellent.

Therefore, the inkjet printing apparatus of the present disclosure can control both gloss types of a matte tone and a gloss tone when it uses a clear ink containing a resin and water, has a low gloss printing mode that is a printing mode imparting a low gloss and a high gloss printing mode that is a printing mode imparting a high gloss, and the heating unit is configured to heat the print target so that an expression: $T_{matte} > T_{gloss}$ is satisfied, or an expression: $HT_{matte} > HT_{gloss}$ is satisfied. In the $T_{matte} > T_{gloss}$, the $T_{matte}$ is a temperature (° C.) of the print target in a low gloss printing region printed in the low gloss printing mode obtained when the clear ink is deposited on the print target, and the $T_{gloss}$ is a temperature (° C.) of the print target in a high gloss printing region printed in the high gloss printing mode obtained when the clear ink is deposited on the print target. In the $HT_{matte} > HT_{gloss}$, the $HT_{matte}$ is a temperature (° C.) of the heating unit in the low gloss printing mode, and the $HT_{gloss}$ is a temperature (° C.) of the heating unit in the high gloss printing mode.

In the present disclosure, when a dry film of the clear ink has a glass transition temperature (Tg) of 50° C. or more, the film of the clear ink becomes strong to improve the abrasion resistance. In addition, when the dry film of the clear ink has a glass transition temperature of 50° C. or more and a glass transition temperature of less than 0° C., the adhesiveness between the clear ink film (layer) and the ground is improved.

The glass transition temperature (Tg) of the dry film of the clear ink can be measured in the following manner.

A differential scanning calorimeter (TA-60WS and DSC-60, available from SHIMADZU CORPORATION) is used. First, ink (4 g) is added to a dish having a diameter of 50 mm and formed of tetrafluoroethylene-perfluoroalkylvinylether copolymer (PFA) so as to be uniformly coated, followed by drying at 50° C. for 1 week. The obtained dry film of the ink (5.0 mg) is charged into a sample container formed of aluminum. The sample container is placed on a holder unit, which is set in an electric furnace.

The heating unit of the inkjet printing apparatus of the present disclosure performs heating so that a temperature of a print target satisfies the following expression: $T_{matte} > T_{gloss}$, preferably performs heating so that the temperature of the print target satisfies the following expression: $T_{matte}-T_{gloss} \geq 10°$ C., and more preferably performs heating so that the temperature of the print target satisfies the following expression: $T_{matte}-T_{gloss} \geq 20°$ C. The temperature HT (° C.) of the heating unit satisfies the following expression: $HT_{matte} > HT_{gloss}$, preferably satisfies the following expression: $HT_{matte} > HT_{gloss} \geq 10°$ C., and more preferably satisfies the following expression: $HT_{matte} > HT_{gloss} \geq 20°$ C., where the $HT_{matte}$ is a temperature (° C.) of the heating unit in the low gloss printing mode and the $HT_{gloss}$ is a temperature (° C.) of the heating unit in the high gloss printing mode.

As a result of this, the heating temperature is increased in the low gloss printing mode and dots are prevented from being wetted and spread. Therefore, dots having a high pile height are formed to form the surface having large irregularities. Meanwhile, in the low gloss printing mode, the heating temperature is decreased to facilitate wetting and spreading of the dots and coalescence of the adjacent dots, to form a smooth surface.

The temperature HT (° C.) of the heating unit is not particularly limited and may be appropriately selected depending on the intended purpose. For example, the setting temperature of the heating unit can be used.

The temperature $T_{matte}$ (° C.) of the print target in the printing part in the low gloss printing mode is preferably 50° C. or more, more preferably 50° C. or more but 80° C. or less.

The temperature $T_{gloss}$ (° C.) of the print target in the printing part in the high gloss printing mode is preferably 70° C. or less, more preferably 60° C. or less.

The temperature $HT_{matte}$ (° C.) of the heating unit in the low gloss printing mode is preferably 50° C. or more, more preferably 50° C. or more but 80° C. or less.

The temperature $HT_{gloss}$ (° C.) of the heating unit in the high gloss printing mode is preferably 70° C. or less, more preferably 60° C. or less.

Such a temperature range makes it possible to achieve a large change in glossiness in each printing mode using the clear ink.

Examples of a method for measuring the temperature of the print target in the printing part include: a method where a thermocouple is disposed on a print medium as a print target, and the temperature of the print medium is directly measured; a method where the temperature of a heater configured to heat a print medium is measured to determine the temperature of the print medium; and a method where a temperature around a print medium is measured in a non-contact manner using, for example, a radiation thermometer, to determine the temperature of the print medium.

In the present disclosure, the following expression: $D_{gloss} > D_{matte}$ is preferably satisfied, and the following expression: $D_{gloss} - D_{matte} \geq 10\%$ is more preferably satisfied, where the $D_{matte}$ is a printing rate of a low gloss print image printed in the low gloss printing mode, and the $D_{gloss}$ is a printing rate of a high gloss print image printed in the high gloss printing mode.

Because a smooth surface is more easily formed at a high printing rate, an image of a high printing rate is printed in the high gloss printing mode. Because coalescence of adjacent dots occurs at a high printing rate and it is difficult to form surface irregularities, an image of a low printing rate is printed in the low gloss printing mode.

Here, the printing rate means the following.

Printing rate (%)=the number of printed dots of clear ink/(vertical resolution×horizontal resolution)×100

(in the formula above, "the number of printed dots of clear ink" is the number of dots per a unit area, which is obtained by actually printing the clear ink, and "vertical resolution" and "horizontal resolution" are each resolution per a unit area. In the case where the clear ink is overlapped and printed to form dots on the same position, "the number of printed dots of clear ink" represents the total number of dots per a unit area, which is obtained by actually printing the clear ink.)

Note that, the printing rate of 100% means the maximum ink weight of a single color relative to a pixel.

<Ink Accommodating Unit>

The ink accommodating unit is configured to store an ink.

The ink accommodating unit is not particularly limited as long as the ink accommodating unit is a member capable of storing an ink therein. Examples of the ink accommodating unit include an ink storage container and an ink tank.

The ink storage container includes the ink stored in a container, and may further include other members appropriately selected depending on the necessity.

The container is not particularly limited, and a shape, structure, size, and material thereof are appropriately selected depending on the intended purpose. Examples of the container include a container including at least an ink bag formed of, for example, an aluminum laminate film and a resin film.

Examples of the ink tank include a main tank and a sub tank.

<Ejection Head>

The ejection head is configured to eject an ink to form a print layer.

The ejection head includes a nozzle plate, a pressurizing chamber, and a stimulus generating unit.

—Nozzle Plate—

The nozzle plate includes a nozzle substrate and an ink repellent film disposed on the nozzle substrate.

—Pressurizing Chamber—

The pressurizing chamber is disposed to correspond to each of a plurality of nozzle holes disposed in the nozzle plate. The pressurizing chambers are a plurality of individual flow channel connected to each of the nozzle holes. The pressurizing chamber may be also referred to as, for example, an ink flow channel, a pressurizing liquid chamber, a pressure chamber, an ejection chamber, or a liquid chamber.

—Stimulus Generating Unit—

The stimulus generating unit is a unit configured to generate stimulus to be applied to an ink.

The stimulus generated by the stimulus generating unit is not particularly limited and may be appropriately selected depending on the intended purpose. Examples of the stimulus include heat (temperature), pressure, vibration, and light. These may be used alone or in combination. Among them, heat and pressure are suitable.

Examples of the stimulus generating unit include a heating device, a pressure device, a piezoelectric element, a vibration generating device, an ultrasonic oscillator, and a light. Specific examples of the stimulus generating unit include: piezoelectric actuators such as piezoelectric elements; thermal actuators each utilizing a phase change caused by film boiling of an ink using an electrothermal energy conversion element such as a heat resistor; shape-memory alloy actuators each utilizing a metal phase change due to a temperature change; and electrostatic actuators each utilizing an electrostatic force.

In the case where the stimulus is "heat," thermal energy corresponding to a printing signal is applied to an ink inside the ink ejection head, for example, by means of a thermal head. Examples thereof include a method where bubbles are formed in the ink by the thermal energy, and the ink is ejected as droplets from the nozzle holes of the nozzle plate by the pressure of the bubbles.

In the case where the stimulus is "pressure," the piezoelectric element is bent by applying voltage to the piezoelectric element bonded to a position, so called, the pressure chamber in an ink flow path in the ink ejection head. As a result, a volume of the pressure chamber is contracted to eject the ink as droplets from the nozzle holes of the ink ejection head.

Among them, a piezo system where an ink is discharged by applying voltage to a piezoelectric element is preferable.

<Heating Unit>

The heating unit is configured to heat a print target.

The heating unit includes a unit configured to heat and dry a print surface and back surface of a print medium as a print target. Examples of the heating unit include an infrared ray heater, a hot air heater, and a heat roller. These may be used alone or in combination.

A method for drying the print medium as the print target is not particularly limited and may be appropriately selected depending on the intended purpose. Examples of the method include: a method where the print medium to which the ink has been deposited is brought into contact with a heated fluid such as hot air as a drying unit; a method where the print medium to which the ink has been deposited is brought into contact with a heating member, followed by heating through heat transfer; and a method where the print medium to which the ink has been deposited is heated by irradiation of energy rays such as inferred rays and far infrared rays.

The heating may be performed before printing, during printing, after printing, or any combination thereof.

By heating before or during printing, printing can be performed on a heated medium. By heating after printing, a printed matter can be dried.

The heating duration is not particularly limited and may be appropriately selected depending on the intended purpose, as long as a surface temperature of the print medium can be controlled to a desired temperature.

The heating duration is preferably controlled by controlling a transferring speed of the print medium as the print target.

<Ink>

As the ink, a clear ink is used.

The clear ink means a colorless and transparent ink that does not substantially contain a colorant.

The clear ink means an aqueous clear ink containing water as a solvent, and may contain an organic solvent if necessary.

The clear ink contains water and a resin. The clear ink preferably contains a surfactant, and further contains other components if necessary.

<<Water>>

The water is not particularly limited and may be appropriately selected depending on the intended purpose. Examples of the water include: pure water such as ion-exchanged water, ultrafiltration water, reverse osmosis-filtered water, and distilled water; and ultrapure water. These may be used alone or in combination.

An amount of the water is preferably 15% by mass or more but 60% by mass or less relative to a total amount of the clear ink. When the amount of the water is 15% by mass or more, the clear ink is prevented from having high viscosity, and ejection stability thereof can be improved. When the amount of the water is 60% by mass or less, wettability to a non-permeable print medium is excellent, and image quality can be improved.

<<Resin>>

Because a dry film of the clear ink has a glass transition temperature of 50° C. or more, the clear ink includes a resin having a glass transition temperature of 50° C. or more.

Inclusion of the resin having a glass transition temperature of 50° C. or more can easily adjust the dry film of the clear ink so as to have a glass transition temperature of 50° C. or more.

The kind of resin is not particularly limited and may be appropriately selected depending on the intended purpose so long as the glass transition temperature is 50° C. or more. Examples of the resin include polyurethane resins, polyester resins, acrylic resins, vinyl acetate-based resins, styrene resins, butadiene resins, styrene-butadiene resins, vinyl chloride resins, acryl-styrene resins, and acryl-silicone resins. These may be used alone or in combination.

When an ink is produced, resin particles formed of any of the above resins are preferably added. The resin particles may be added to the ink in a state of a resin emulsion in which the resin particles are dispersed using water as a dispersion medium. As the resin particles, resin particles appropriately synthesized may be used, or a commercially available product may be used. These may be used alone or in combination.

When two kinds of resin particles are combined, the ink includes at least one kind of resin having a glass transition temperature (Tg) of 50° C. or more, and may include a resin having a glass transition temperature (Tg) of less than 50° C. in combination. When the clear ink includes at least two resin particles: a resin particle having a glass transition temperature (Tg) of 50° C. or more and a resin particle having a glass transition temperature (Tg) of less than 50° C., a dry film of the clear ink can be easily adjusted so as to have a glass transition temperature (Tg of 50° C. or more and a glass transition temperature (Tg) of less than 0° C.

Use of the clear ink containing at least two kinds of resin particles of a resin particle having a glass transition temperature (Tg) of 50° C. or more and a resin particle having a glass transition temperature (Tg) of less than 0° C. can achieve the abrasion resistance and the adhesiveness.

A ratio between the resin particle having a glass transition temperature (Tg) of 50° C. or more and the resin particle having a glass transition temperature (Tg) of less than 0° C. is preferably from 98:2 through 80:20 by a mass ratio. It is more preferable to include a larger amount of the resin particle having a glass transition temperature (Tg) of 50° C. or more.

Here, the glass transition temperature (Tg) of the resin particle can be measured using, for example, a differential scanning calorimeter (TA-60WS and DSC-60, available from SHIMADZU CORPORATION).

In the present disclosure, among the resins, a polyurethane resin is preferably used. Addition of the polyurethane resin strengthens the coating film itself when an ink film is formed using the clear ink. This is preferable because it is easy to prevent partial peeling of the coating film due to breakage inside the coating film, and a change in a color tone of the friction area due to a change in the surface state of the coating film.

—Polyurethane Resin—

Examples of the polyurethane resin include polyether-based polyurethane resins, polycarbonate-based polyurethane resins, and polyester-based polyurethane resins.

The polyurethane resin is not particularly limited and may be appropriately selected depending on the intended purpose. Examples of the polyurethane resin include polyurethane resins obtained by reacting polyol with polyisocyanate.

—Polyol—

Examples of the polyol include polyether polyol, polycarbonate polyol, and polyester polyol. These may be used alone or in combination.

—Polyether Polyol—

Examples of the polyether polyol include polyether polyol obtained by addition polymerization of alkylene oxide using at least one compound including 2 or more active hydrogen atoms as a starting material.

Examples of the compound including 2 or more active hydrogen atoms include ethylene glycol, diethylene glycol, triethylene glycol, propylene glycol, trimethylene glycol, 1,3-butanediol, 1,4-butanediol, 1,6-hexanediol, glycerin, trimethylol ethane, and trimethylol propane. These may be used alone or in combination.

Examples of the alkylene oxide include ethylene oxide, propylene oxide, butylene oxide, styrene oxide, epichlorohydrin, and tetrahydrofuran. These may be used alone or in combination.

The polyether polyol is not particularly limited and may be appropriately selected depending on the intended purpose. In order to obtain a binder for an ink capable of imparting extremely excellent abrasion resistance, polyoxytetramethylene glycol and polyoxypropylene glycol are preferable. These may be used alone or in combination.

—Polycarbonate Polyol—

Moreover, examples of the polycarbonate polyol that can be used for producing the polyurethane resin include polycarbonate polyol obtained by reacting carbonic acid ester with polyol, and polycarbonate polyol obtained by reacting phosgene with bisphenol A. These may be used alone or in combination.

Examples of the carbonic acid ester include methyl carbonate, dimethyl carbonate, ethyl carbonate, diethyl carbonate, cyclocarbonate, and diphenyl carbonate. These may be used alone or in combination.

Examples of the polyol include: dihydroxy compounds having a relatively low molecular weight, such as ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentanediol, 1,5-hexanediol, 2,5-hexanediol, 1,6-hexanediol, 1,7-heptanediol, 1,8-octanediol, 1,9-nonanediol, 1,10-decanediol, 1,11-undecanediol, 1,12-dodecanediol, 1,4-cyclohexanediol, 1,4-cyclohexanedimethanol, hydroquinone, resorcinol, bisphenol-A, bisphenol-F, and 4,4'-biphenol; polyether polyol, such as polyethylene glycol, polypropylene glycol, and polyoxytetramethylene glycol; and polyester polyol, such as polyhexamethylene adipate, polyhexamethylene succinate, and polycaprolactone. These may be used alone or in combination.

—Polyester Polyol—

Examples of the polyester polyol include polyester polyol obtained through an esterification reaction between low molecular weight polyol and polycarboxylic acid, polyester obtained through a ring-opening polymerization reaction of a cyclic ester compound such as s-caprolactone, and copolymer polyester thereof. These may be used alone or in combination.

Examples of the low molecular weight polyol include ethylene glycol and propylene glycol. These may be used alone or in combination.

Examples of the polycarboxylic acid include succinic acid, adipic acid, sebacic acid, dodecane dicarboxylic acid, terephthalic acid, isophthalic acid, phthalic acid, anhydrides thereof, and ester-formable derivatives thereof. These may be used alone or in combination.

—Polyisocyanate—

Examples of the polyisocyanate include: aromatic diisocyanate, such as phenylene diisocyanate, tolylene diisocyanate, diphenylmethane diisocyanate, and naphthalene diisocyanate; and aliphatic or alicyclic diisocyanate, such as hexamethylene diisocyanate, lysine diisocyanate, cyclohexane diisocyanate, isophorone diisocyanate, dicyclohexylmethane diisocyanate, xylene diisocyanate, tetramethylxylene diisocyanate, and 2,2,4-trimethylhexamethylene diisocyanate. These may be used alone or in combination. Among them, alicyclic diisocyanate is preferable in terms of weather resistance.

Moreover, intended coating film strength and abrasion resistance can be easily obtained by using at least one kind of alicyclic diisocyanate.

Examples of the alicyclic diisocyanate include isophorone diisocyanate and dicyclohexylmethane diisocyanate.

An amount of the alicyclic diisocyanate is preferably 60% by mass or more relative to a total amount of the isocyanate compound.

[Production Method of Polyurethane Resin]

The polyurethane resin is not particularly limited and can be obtained by any of production methods typically used in the art. Examples of the production method include the following method.

First, the polyol and the polyisocyante are allowed to react at an equivalent ratio with which isocyanate groups are excessive without a solvent or in the presence of an organic solvent, to thereby produce a urethane prepolymer including an isocyanate terminal.

Subsequently, anionic groups in the urethane prepolymer including the isocyanate terminal are neutralized by a neutralizer if necessary. Thereafter, the prepolymer is allowed to react with a chain extender, followed by removing the organic solvent in the system if necessary, to thereby obtain a polyurethane resin.

Examples of the organic solvent that can be used for producing the polyurethane resin include: ketones such as acetone and methyl ethyl ketone; ethers such as tetrahydrofuran and dioxane; acetic acid esters such as ethyl acetate and butyl acetate; nitriles such as acetonitrile; and amides such as dimethylformamide, N-methylpyrrolidone, and N-ethylpyrrolidone. These may be used alone or in combination.

Examples of the chain extender include polyamine and other active hydrogen group-containing compounds.

Examples of the polyamine include: diamines such as ethylenediamine, 1,2-propanediamine, 1,6-hexamethylenediamine, piperazine, 2,5-dimethylpiperazine, isophoronediamine, 4,4'-dicyclohexylmethanediamine, and 1,4-cyclohexanediamine; polyamines such as diethylenetriamine, dipropylenetriamine, and triethylenetetramine; hydrazines such as hydrazine, N,N'-dimethylhydrazine, and 1,6-hexamethylenebishydrazine; and dihydrazides such as succinic dihydrazide, adipic dihydrazide, glutaric dihydrazide, sebacic dihydrazide, and isophthalic dihydrazide. These may be used alone or in combination.

Examples of the other active hydrogen group-containing compounds include: glycols such as ethylene glycol, diethylene glycol, triethylene glycol, propylene glycol, 1,3-propanediol, 1,3-butanediol, 1,4-butanediol, hexamethylene glycol, saccharose, methylene glycol, glycerin, and sorbitol; phenols such as bisphenol A, 4,4'-dihydroxydiphenyl, 4,4'-dihydroxydiphenyl ether, 4,4'-dihydroxydiphenylsulfone, hydrogenated bisphenol A, and hydroquinone; and water. These may be used alone or in combination so long as the storage stability of the ink is not decreased.

The polyurethane resin is preferably a polycarbonate-based polyurethane resin in terms of water resistance, heat resistance, abrasion resistance, weather resistance, and abrasion resistance of an image owing to high aggregation force of carbonate groups. When the polycarbonate-based polyurethane resin is used, an ink suitable for a printed matter used in a severe environment such as outdoor use can be obtained.

As the polyurethane resin, a commercially available product may be used. Examples of the commercially available product include UCOAT UX-485 (polycarbonate-based polyurethane resin), UCOAT UWS-145 (polyester-based polyurethane resin), PERMARIN UA-368T (polycarbonate-based polyurethane resin), and PERMARIN UA-200 (polyether-based polyurethane resin) (all of which are available from Sanyo Chemical Industries, Ltd.). These may be used alone or in combination.

An amount of the resin in the clear ink is preferably 8% by mass or more, more preferably 8% by mass or more but 25% by mass or less. When the amount of the resin in the clear ink is preferably 8% by mass or more, a low gloss and a high gloss can be controlled in a small amount of the clear ink. Meanwhile, when the amount of the resin is more than 25% by mass, the ejection stability of the ink may be decreased.

Low gloss is achieved by forming individual dots each having a high height of a dot sphere (pile height), and imparting irregularities to the surface.

A large amount of the resin in the clear ink is preferable because dots having high pile heights are easily formed and low gloss is easily imparted.

On the other hand, the irregularities of a surface are filled with a clear ink to form a smooth surface, which imparts smoothness. As a result, high gloss can be achieved. In order to fill the irregularities of the surface with the clear ink, use of a large amount of the resin in the clear ink is preferable because the irregularities of the surface can be filled in a small amount of the clear ink and high gloss is easily imparted.

<Surfactant>

The clear ink preferably includes a surfactant.

When the surfactant is added to the ink, the surface tension of the ink is decreased to accelerate permeation of the ink to a print medium after the ink droplets are landed on the print medium such as paper. Therefore, feathering or color bleeding can be decreased.

The surfactant is classified into a nonionic surfactant, an anionic surfactant, and an amphoteric surfactant depending on a polarity of a hydrophilic group.

Moreover, the surfactant is classified into a fluorine-based surfactant, a silicone-based surfactant, and an acetylene-based surfactant depending on a structure of a hydrophobic group.

In the present disclosure, a fluorine-based surfactant is mainly used, but a silicone-based surfactant or an acetylene-based surfactant may be used in combination.

An amount of the surfactant is preferably 2% by mass or less, more preferably 0.05% by mass or more but 2% by mass or less, still more preferably 0.1% by mass or more but 2% by mass or less. When the amount of the surfactant is 2% by mass or less, significant reduction in glossiness can be achieved in the low gloss printing mode.

As the surfactant, any of silicone-based surfactants, fluorosurfactants, amphoteric surfactants, nonionic surfactants, and anionic surfactants can be used.

The silicone-based surfactant has no specific limit and can be suitably selected to suit to a particular application. Of these, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A silicone-based surfactant having a polyoxyethylene group or a polyoxyethylene polyoxypropylene group is particularly preferable because such an agent demonstrates good characteristics as an aqueous surfactant. It is possible to use a polyether-modified silicone-based surfactant as the silicone-based surfactant. A specific example thereof is a compound in which a polyalkylene oxide structure is introduced into the side chain of the Si site of dimethyl silooxane.

Specific examples of the fluoro surfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These are particularly preferable because they do not foam easily. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain. Counter ions of salts in these fluorine-based surfactants are, for example, Li, Na, K, $NH_4$, $NH_3CH_2CH_2OH$, $NH_2(CH_2CH_2OH)_2$, and $NH(CH_2CH_2OH)_3$.

Examples of the amphoteric surfactants include lauryl aminopropionic acid salts, lauryl dimethyl betaine, stearyl dimethyl betaine, and lauryl dihydroxyethyl betaine.

Examples of the nonionic surfactants include polyoxyethylene alkyl phenyl ether, polyoxyethylene alkyl ester, polyoxyethylene alkyl amine, polyoxyethylene alkyl amide, polyoxyethylene propylene block polymers, sorbitan fatty acid esters, polyoxyethylene sorbitan fatty acid esters, and ethylene oxide adducts of acetylene alcohol.

Examples of the anionic surfactants include polyoxyethylenealkyl ether acetate, dodecyl benzene sulfonate, laurate, and polyoxyethylene alkyl ether sulfate.

These may be used alone or in combination.

The silicone-based surfactants has no particular limit. Specific examples thereof include, but are not limited to, side-chain-modified polydimethyl siloxane, both end-modified polydimethylsiloxane, one-end-modified polydimethylsiloxane, and side-chain-both-end-modified polydimethylsiloxane. In particular, a polyether-modified silicone-based surfactant having a polyoxyethylene group or a polyoxyethylene polyoxypropylene group is particularly preferable because such a surfactant demonstrates good characteristics as an aqueous surfactant.

Any suitably synthesized surfactant and any product thereof available on the market is suitable. Products available on the market are obtained from Byc Chemie Japan Co., Ltd., Shin-Etsu Silicone Co., Ltd., Dow Corning Toray Co., Ltd., etc., NIHON EMULSION Co., Ltd., Kyoeisha Chemical Co., Ltd., etc.

The polyether-modified silicon-containing surfactant has no particular limit. Examples thereof include a compound in which the polyalkylene oxide structure represented by the following General Formula (S-1) is introduced into the side chain of the Si site of dimethyl polysiloxane.

[General Formula (S-1)]

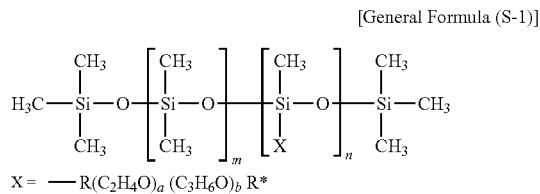

$X = -R(C_2H_4O)_a (C_3H_6O)_b R*$

In the General Formula (S-1), "m", "n", "a", and "b" each, respectively represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

A fluorosurfactant in which the number of carbon atoms replaced with fluorine atoms is from 2 to 16 is preferable and, 4 to 16, more preferable.

Specific examples of the fluorosurfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because they do not foam easily and the fluorosurfactant represented by the following General Formula (F-1) or General Formula (F-2) is more preferable.

[General Formula (F-1)]

In a compound represented by the General Formula (F-1), "m" is preferably an integer of from 0 to 10, and "n" is preferably an integer of from 0 to 40, in order to impart water solubility.

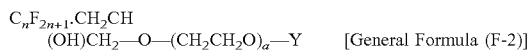

[General Formula (F-2)]

In a compound represented by the General Formula (F-2), Y represents H, $C_mF_{2m+1}$ (where "m" is an integer of from 1 to 6), $CH_2CH(OH)CH_2-C_mF_{2m+1}$ (where m represents an integer of from 4 to 6), or $C_pH_{2p+1}$ (where p represents an integer of from 1 to 19); "n" represents an integer of from 1 to 6; and "a" represents an integer of from 4 to 14.

Products available on the market may be used as the fluorosurfactant. Specific examples of the products available on the market include, but are not limited to, SURFLON S-111, SURFLON S-112, SURFLON S-113, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL (registered trademark) TBS, FSP, FSA, FSN-100, FSN, FSO-100, FSO, FS-300, UR, CAPSTONE (registered trademark) FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.), and UNIDYNE DSN-403N (manufactured by DAIKIN INDUSTRIES). Of these, FS-3100, FS-34, and FS-300 (all manufactured by The Chemours Company); FT-110, FT-250, FT-251, FT-400S, FT-150, and FT-400SW (all manufactured by NEOS COMPANY LIMITED); PolyFox PF-151N (manufactured by OMNOVA SOLUTIONS INC.); and UNIDYNE DSN-403N (manufactured by DAIKIN INDUSTRIES) are particularly preferable in terms of good printing quality, coloring in particular, and improvement on permeation, wettability, and uniform dying property to paper.

<<Organic Solvent>>

The clear ink may include an organic solvent. The organic solvent is not particularly limited and may be appropriately selected depending on the intended purpose. Examples of the organic solvent include water-soluble organic solvents. The "water-soluble" organic solvent means that, for example, 5 g or more of the organic solvent is dissolved in 100 g of water at 25° C.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 2,3-butanediol, 3-methyl-1,3-butanediol, 3-methoxy-3-methylbutanol, triethylene glycol, polyethylene glycol, polypropyleneglycol, 1,5-pentanediol, 2-methyl-2,4-pentanediol, 1,6-hexanediol, glycerin, 1,2,6-hexanetriol, 2-ethyl-1,3-hexanediol, ethyl 1,2,4-butanetriol, 1,2,3-butanetriol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, propylene glycol monoethylether, and dipropylene glycol monomethylether; polyol arylethers such as ethylene glycol monophenyl ether and ethylene glycol monobenzylethers; nitrogen-containing heterocyclic compounds such as 2-pyrolidone, N-methyl-2-pyrolidone, N-hydroxyethyl-2-pyrolidone, 1,3-dimethylimidazolidinone, s-caprolactam, and γ-butyrolactone; amides such as formamide, N-methylformamide, and N,N-dimethylformamide; amines such as monoethanolamine, diethanolamine, and triethylamine; sulfur-containing compounds such as dimethyl sulfoxide, sulfolane, and thiodiethanol; propylene carbonate, and ethylene carbonate. These may be used alone or in combination.

The proportion of the organic solvent in the clear ink has no particular limit and can be suitably selected to suit a particular application. In terms of the drying property and discharging reliability of the ink, the proportion is preferably 10% by mass or more but 60% by mass or less, more preferably 20% by mass or more but 60% by mass or less.

The clear ink may include, as other components, a defoaming agent, a preservative and fungicide, a corrosion inhibitor, and a pH regulator, according to the necessity.

—Defoaming Agent—

The defoaming agent is not particularly limited. Examples thereof include silicone-based defoaming agents, polyether-based defoaming agents, and fatty acid ester-based defoaming agent. These may be used alone or in combination. Among them, silicone-based defoaming agents are preferable because the silicone-based defoaming agents have an excellent defoaming effect.

—Preservatives and Fungicides—

The preservatives and fungicides are not particularly limited. Examples thereof include 1,2-benzoisothiazolin-3-one.

—Corrosion Inhibitor—

The corrosion inhibitor is not particularly limited. Examples thereof include acid sulfite and sodium thiosulfate.

—pH Regulator—

The pH regulator is not particularly limited as long as the pH regulator can adjust pH to 7 or higher. Examples thereof include amines such as diethanolamine and triethanol amine.

The property of the clear ink is not particularly limited and may be appropriately selected depending on the intended purpose. For example, viscosity, surface tension, pH, etc. are preferably in the following ranges.

The viscosity of the clear ink at 25° C. is preferably from 5 to 30 mPa·s and more preferably from 5 to 25 mPa·s to improve print density and text quality and obtain good dischargeability. The viscosity can be measured by, for example, a rotatory viscometer (RE-80L, manufactured by TOKI SANGYO CO., LTD.). The measuring conditions are as follows:

Standard cone rotor (1° 34'×R24)
Sample liquid amount: 1.2 mL
Number of rotations: 50 rotations per minute (rpm)
25° C.
Measuring time: three minutes The surface tension of the clear ink is preferably 35 mN/m or less and more preferably 32 mN/m or less at 25° C. in terms that the clear ink is suitably levelized on a print medium and the drying time of the clear ink is shortened.

The pH of the clear ink is preferably from 7 to 12 and more preferably from 8 to 11 in terms of prevention of corrosion of metal members that contacts with the liquid.

<Print Target>

The print target is not limited to materials used as print media. For example, building materials (e.g., wall paper, floor materials, and tiles), cloth for apparel (e.g., T-shirts), textiles, and leather are appropriately applied. Note that, ceramics, glass, or metals may be also used as the print target by adjusting a structure of a path where the print medium is transported.

The print medium is not particularly limited. Plain paper, gloss paper, special paper, or cloth may be used as the print medium, but image formation can be also excellently performed using a non-permeable base.

The non-permeable base is a base having a surface of low water permeation and absorption. The non-permeable base includes a material where a number of voids are included inside the material but the voids are not exposed to the surfaces of the material. More quantitatively, the non-permeable base is a base having water absorption of 10 mL/m$^2$ or less determined from the starting of contact to 30 msec$^{1/2}$ by the Bristow method.

As the non-permeable base, for example, a plastic film such as a vinyl chloride resin film, a polyethylene terephthalate (PET) film, an acrylic resin film, a polypropylene film, a polyethylene film, and a polycarbonate film can be suitably used.

In the present disclosure, a print target having high glossiness is preferably used in the low gloss printing mode. Use of the print target having high glossiness is preferable because a low gloss effect obtained by the clear ink can be easily enhanced.

On the other hand, a print target having low glossiness is preferably used in the high gloss printing mode. Use of the print target having low glossiness is preferable because a high gloss effect obtained by the clear ink can be easily enhanced.

Accordingly, the following expression: $G_{matte}>G_{gloss}$ is preferably satisfied and the following expression: $G_{matte}-G_{gloss} \geq 100$ is more preferably satisfied, where the $G_{matte}$ is glossiness of the print target used in the low gloss printing mode, and the $G_{gloss}$ is glossiness of the print target used in the high gloss printing mode.

(Method for Controlling Glossiness of Print Image)

A method of the present disclosure for controlling glossiness of a print image includes: ejecting an ink on a print target to form a print layer; and heating the print target printed. The ink is a clear ink including a resin and water. A dry film of the clear ink has a glass transition temperature of 50° C. or more. The method for controlling the glossiness of the print image has a first printing mode and a second printing mode. When printing is performed in the first printing mode, control of increasing a heating temperature is performed. When printing is performed in the second printing mode, control of decreasing the heating temperature is performed.

The first printing mode may be referred to as a low gloss printing mode that is a printing mode imparting a low gloss, and the second printing mode may be referred to as a high gloss printing mode that is a printing mode imparting a high gloss.

(Printed Matter)

A printed matter of the present disclosure includes: a print target; and a print layer on the print target. The print layer is formed of a dry film of a clear ink including a resin. The dry film of the clear ink has a glass transition temperature of 50° C. or more. The printed matter includes a first printed image printed in a first printing mode and a second printed image printed in a second printing mode. A difference in glossiness (Ga−Gb) is 20 or more, where the Ga is a 60° glossiness of the second printed image, and the Gb is a 60° glossiness of the print target used in the second printing mode. A difference in glossiness (Gc−Gd) is −20 or less, where the Gc is a 60° glossiness of the first printed image, and the Gd is a 60° glossiness of the print target used in the first printing mode.

The first printing mode may be referred to as a low gloss printing mode that is a printing mode imparting a low gloss, and the second printing mode may be referred to as a high gloss printing mode that is a printing mode imparting a high gloss.

An image can be formed to provide a printed matter by the inkjet printing apparatus and the inkjet printing method.

<Printing Device and Printing Method>

The printing device and the printing method will be described as a case where a black (K) ink, a cyan (C) ink, a magenta (M) ink, and a yellow (Y) ink are used, hereinafter. However, a clear ink may be used instead of or in addition to the black (K) ink, the cyan (C) ink, the magenta (M) ink, and the yellow (Y) ink.

The clear ink for use in the present disclosure can be suitably used for various printing devices according to an inkjet printing system, such as a printer, a facsimile, a photocopier, printer/fax/copier multifunction peripheral, and a 3D printer.

The inkjet printing apparatus may be a serial type device where an ejection head is moved, or a line-type device where an ejection head is not moved, unless otherwise stated.

Furthermore, in addition to the desktop type, the inkjet printing apparatus includes a wide printing device, or a continuous printer capable of using continuous paper wound up in a roll form as print media.

In the present disclosure, the printing device and the printing method represent a device capable of discharging an ink, various processing fluids, etc. to a print medium and a method for performing printing using the device. The print medium means an article to which the ink or the various processing fluids can be attached at least temporarily.

The printing device may further optionally include a device relating to feeding, transferring, and ejecting the print medium and other devices referred to as a pre-processing device, a post-processing device, etc. in addition to the head portion to discharge the ink.

In addition, the printing device and the printing method are not limited to those producing merely meaningful visible images such as texts and figures with the ink. For example, the printing device and the printing method can produce patterns like geometric design and 3D images.

In addition, the printing device includes both a serial type device in which the ejection head is moved and a line type device in which the ejection head is not moved, unless otherwise specified.

Furthermore, in addition to the desktop type, this printing device includes a wide printing device capable of printing images on a large print medium such as A0, and a continuous printer capable of using continuous paper wound up in a roll form as print media.

Figure 2:
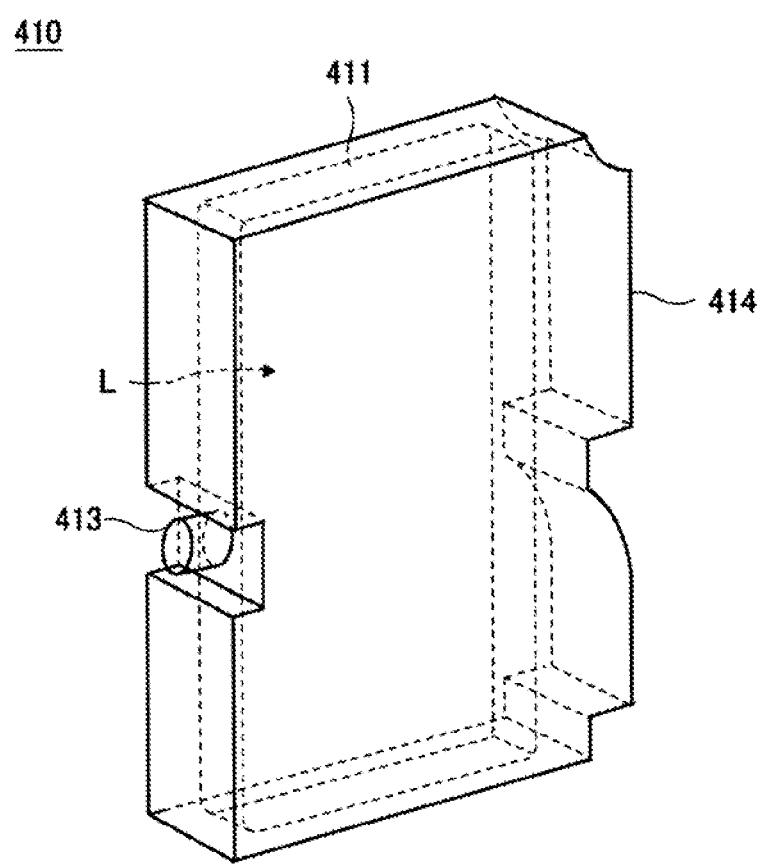
FIG. 2 is a perspective explanatory view illustrating an example of a main tank of the image forming apparatus of FIG. 1.

The printing device of the present disclosure is described using an example with reference to FIG. 1 and FIG. 2. FIG. 1 is a perspective explanatory view illustrating the image printing device. FIG. 2 is a perspective explanatory view illustrating the main tank. An image forming apparatus 400 as an example of the printing device is a serial type image forming apparatus. A mechanical unit 420 is disposed in an exterior 401 of the image forming apparatus 400. Each ink accommodating unit (ink container) 411 of each main tank 410 (410k, 410c, 410m, and 410y) for each color of black (K), cyan (C), magenta (M), and yellow (Y) is made of a packing member such as an aluminum laminate film. The ink container 411 is accommodated in a plastic housing unit 414. As a result, the main tank 410 is used as an ink cartridge of each color.

A cartridge holder 404 is disposed on the rear side of the opening when a cover 401c of the device main body is opened. The cartridge holder 404 is detachably attached to the main tank 410. As a result, each ink discharging outlet 413 of the main tank 410 is communicated with a discharging head 434 for each color via a supplying tube 436 for each color so that the ink can be discharged from the discharging head 434 to a print medium.

This printing device may include not only a portion discharging ink but also a device referred to as a pre-processing device, a post-processing device, etc.

As an example of the pre-processing device and the post-processing device, as in the case of the ink such as black (K), cyan (C), magenta (M), and yellow (Y), a liquid container containing a pre-processing fluid or a post-processing fluid and a liquid discharging head are added to discharge the pre-processing fluid or the post-processing fluid in an inkjet printing method.

As another example of the pre-processing device and the post-processing device, it is suitable to dispose a pre-processing device and a post-processing device employing a blade coating method, a roll coating method, or a spray coating method other than the inkjet printing method.

How to use the ink is not limited to the inkjet printing method and can be widely used. Specific examples of such methods other than the inkjet printing method include, but are not limited to, blade coating methods, gravure coating methods, bar coating methods, roll coating methods, dip coating methods, curtain coating methods, slide coating methods, die coating methods, and spray coating methods.

The applications of the ink of the present disclosure are not particularly limited and may be appropriately selected depending on the intended purpose. For example, the ink can be used for a printed matter, a paint, a coating material, and foundation. The ink can be used to form two-dimensional texts and images and furthermore a three-dimensional solid object (3D modeling object) as a material for 3D modeling.

An apparatus for fabricating a three-dimensional object can be any known device with no particular limit. For example, the apparatus includes an ink container, a supplying device, a discharging device, a drier, etc. The three-dimensional solid object includes an object manufactured by re-applying ink. In addition, the three-dimensional solid object can be manufactured by processing a structure having a substrate such as a print medium printed with the ink as a modeled processed product. The modeled processed product is fabricated by, for example, heating drawing or punching a structure or printed matter having a sheet-like form, film-like form, etc. For example, the ink can be suitably used for the application of forming after decorating a surface, such as panels of meters or control units of cars, OA appliances, electric or electronic devices, cameras, etc.

Moreover, image forming, recording, printing, etc. in the present disclosure represent the same meaning.

A print medium, a medium, and a print target represent the same meaning.

EXAMPLES

The present disclosure will be described by way of Examples hereinafter. However, the present disclosure should not be construed as being limited to these Examples. Note that, in Examples, for example, the preparation, production, and evaluation were performed under the following conditions: room temperature of 25° C. and humid of 60% RH, unless otherwise specified.

Preparation Example 1

<Preparation of Resin Emulsion 1>
—Preparation of Polycarbonate-Based Polyurethane Resin—

A reaction vessel equipped with a stirrer, a reflux condenser, and a thermometer was charged with polycarbonate diol (1,500 parts by mass) (a reaction product between 1,6-hexanediol and dimethyl carbonate (number average molecular weight (Mn): 1,000)), 2,2-dimethylolpropionic acid (220 parts by mass) (may be referred to as "DMPA" hereinafter), and N-methylpyrrolidone (1,347 parts by mass) (may be referred to as "NMP" hereinafter) under a nitrogen flow, and the resultant mixture was heated at 60° C. to dissolve DMPA.

Next, 4,4'-dicyclohexylmethanediisocyanate (1,615 parts by mass) and dibutyl tin laurate (catalyst) (2.6 parts by mass) were added, and the resultant mixture was heated at 90° C. to perform an urethanation reaction for 5 hours, to thereby obtain a urethane prepolymer including an isocyanate terminal. The resultant reaction mixture was cooled to 80° C. To the reaction mixture, triethylamine (194 parts by mass) was added and mixed. From the resultant mixture, the mixture (4,340 parts by mass) was taken out. The mixture was then added to a mixed solution including water (5,400 parts by mass) and triethylamine (15 parts by mass) under strong stirring.

Next, to the resultant, ice (1,500 parts by mass) was added, and a 35% by mass 2-methyl-1,5-pentanediamine aqueous solution (783 parts by mass) was added to perform a chain extension reaction. Then, the solvent was removed to obtain a solid content concentration of 30% by mass, to thereby obtain polycarbonate-based polyurethane resin emulsion 1.

When a glass transition temperature of the obtained polycarbonate-based polyurethane resin emulsion was measured, the glass transition temperature was "53° C.".

<Measurement Method of Glass Transition Temperature>

The glass transition temperature of the resin emulsion was measured in the following manner.

First, the resin emulsion (4 g) was added to a dish having a diameter of 50 mm and formed of tetrafluoroethylene-perfluoroalkylvinylether copolymer (PFA) so as to be uniformly coated, followed by drying at 50° C. for 1 week. The obtained resin film (5.0 mg) was charged into a sample container formed of aluminum. The sample container was placed on a holder unit, which was set in an electric furnace.

Next, under nitrogen atmosphere, the resin film was heated from 0° C. to 150° C. at a heating speed of 10° C./min, was cooled from 150° C. to −80° C. at a cooling speed of 5° C./min, and was heated to 150° C. at a heating speed of 10° C./min, to determine a DSC curve.

From the obtained DSC curve, using the analysis program in the DSC-60 system, analysis from the inflection part obtained at the time of the second heating was performed by the midpoint method, to determine a glass transition temperature (Tg).

Preparation Example 2

<Preparation of Resin Emulsion 2>
—Preparation of Polyester-Based Polyurethane Resin—

A reaction vessel, which was equipped with a stirrer, a thermometer, a nitrogen sealing tube, and a condenser and had a capacity of 2 L, was charged with methyl ethyl ketone (100 parts by mass), polyester polyol (1) (polyester polyol obtained from iPA/AA=6/4 (molar ratio) and EG/NPG=1/9 (molar ratio), number average molecular weight: 2,000, average number of functional groups: 2, iPA: isophthalic acid, AA: adipic acid, EG: ethylene glycol, and NPG: neopentyl glycol) (345 parts by mass), and 2,2-dimethylolpropionic acid (DMPA) (9.92 parts by mass). Then, the materials were uniformly mixed at 60° C.

Then, triethylene glycol diisocyanate (TEGDI) (40.5 parts by mass) and dioctyltin dilaurate (DOTDL) (0.08 parts by mass) were charged thereinto, and were allowed to react at 72° C. for 3 hours, to obtain a polyurethane solution.

IPA (80 parts by mass), MEK (220 parts by mass), triethanolamine (TEA) (3.74 parts by mass), and water (596 parts by mass) were charged into the polyurethane solution, and were subjected to phase inversion. Then, MEK and IPA were removed using a rotary evaporator to obtain a polyurethane resin emulsion 1.

After the obtained aqueous emulsion was cooled to normal temperature, ion-exchanged water and an aqueous sodium hydroxide solution were added thereto so as to have a solid content concentration of 30% by mass and pH of 8.

The glass transition temperature, which was measured in the same manner as in the resin emulsion 1, was found to be "−4° C.".

Preparation Example 3

<Preparation of Resin Emulsion 3>
—Preparation of Polycarbonate-Based Polyurethane Resin—

A reaction vessel equipped with a stirrer, a reflux condenser, and a thermometer was charged with polycarbonate diol (1,500 parts by mass) (a reaction product between 1,6-hexanediol and dimethyl carbonate (number average molecular weight (Mn): 1,000)), 2,2-dimethylolpropionic acid (220 parts by mass) (may be referred to as "DMPA" hereinafter), and N-methylpyrrolidone (1,347 parts by mass) (may be referred to as "NMP" hereinafter) under a nitrogen flow, and the resultant mixture was heated at 60° C. to dissolve DMPA.

Next, 4,4'-dicyclohexylmethanediixocyanate (1,530 parts by mass) and dibutyl tin laurate (catalyst) (2.6 parts by mass) were added, and the resultant mixture was heated at 90° C. to perform an urethanation reaction for 5 hours, to thereby obtain a urethane prepolymer including an isocyanate terminal. The resultant reaction mixture was cooled to 80° C. To the reaction mixture, triethylamine (170 parts by mass) was added and mixed. From the resultant mixture, the mixture (4,340 parts by mass) was taken out. The mixture was then added to a mixed solution including water (5,400 parts by mass) and triethylamine (15 parts by mass) under strong stirring.

Next, to the resultant, ice (1,500 parts by mass) was added, and a 35% by mass 2-methyl-1,5-pentanediamine aqueous solution (705 parts by mass) was added to perform a chain extension reaction. Then, the solvent was removed to obtain a solid content concentration of 30% by mass, to thereby obtain polycarbonate-based polyurethane resin emulsion 1.

When a glass transition temperature of the obtained polycarbonate-based polyurethane resin emulsion was measured, the glass transition temperature was "46° C.".

Production Example 1 of Clear Ink

—Production of Clear Ink A—

First, the polyurethane resin emulsion 1 (25% by mass) (solid content concentration: 30% by mass) of Preparation Example 1, 1,2-propanediol (19% by mass), 1,3-propanediol (11% by mass), 1,2-butanediol (3% by mass), the product name: FS-300 (6% by mass) (fluorosurfactant, obtained from E.I. du Pont de Nemours & Company, solid content concentration: 40% by mass) as a surfactant, and ultra pure water (36% by mass) were added, followed by mixing and stirring, to prepare a mixture.

Next, the obtained mixture was filtered using a polypropylene filter having an average pore size of 0.2 μm (product name: Betafine polypropylene pleated filter PPG series, obtained from 3M), to thereby produce clear ink A.

Production Examples 2 to 7 of Clear Inks

—Production of Clear Inks B to G—

Clear inks B to G were produced in the same manner as in the Production Example 1 of clear ink except that the ink formulation was each changed to an ink formulation presented in Table 1-1 and Table 1-2.

Next, the obtained clear inks A to G were measured for a glass transition temperature (Tg) of a dry film of each clear ink in the following manner. Results were presented in Table 1-1 and Table 1-2.

<Measurement of Glass Transition Temperature (Tg) of Dry Film of Clear Ink>

The measurement was performed using a differential scanning calorimeter (TA-60WS and DSC-60, obtained from SHIMADZU CORPORATION) in the following manner.

First, the ink (4 g) was added to a dish having a diameter of 50 mm and formed of tetrafluoroethylene-perfluoroalkyl-vinylether copolymer (PFA) so as to be uniformly coated, followed by drying at 50° C. for 1 week. The obtained dry film of the ink (5.0 mg) was charged into a sample container formed of aluminum. The sample container was placed on a holder unit, which was set in an electric furnace.

Next, under nitrogen atmosphere, the ink film was heated from 0° C. to 150° C. at a heating speed of 10° C./min, was cooled from 150° C. to −80° C. at a cooling speed of 5C/min, and was heated to 150° C. at a heating speed of 10° C./min, to determine a DSC curve.

From the obtained DSC curve, using the analysis program in the DSC-60 system, analysis from the inflection part obtained at the time of the second heating was performed by the midpoint method, to determine a glass transition temperature of the dry film of the clear ink (Tg).

TABLE 1-1

|  |  | Production Example 1 Clear ink A | Production Example 2 Clear ink B | Production Example 3 Clear ink C | Production Example 4 Clear ink D |
|---|---|---|---|---|---|
| Resins | Resin emulsion 1 Polycarbonate-based urethane (water dispersible, solid content: 30% by mass, Tg: 53° C.) | 25 | 30 | 30 | 40 |
|  | Resin emulsion 2 Polyester-based urethane (water dispersible, solid content: 30% by mass, Tg: −4° C.) |  |  |  |  |
|  | Resin emulsion 3 Polycarbonate-based urethane (water dispersible, solid content: 30% by mass, Tg: 46° C.) |  |  |  |  |
| Water | Highly pure water | 36 | 32.6 | 33.5 | 26.5 |
| Surfactant | FS-300 (obtained from DuPont) (solid content: 40% by mass) | 6 | 6 | 4.5 | 4.5 |
| Organic solvents | 1,2-Propanediol | 19 | 17.4 | 18 | 15 |
|  | 1,3-Propanediol | 11 | 11 | 11 | 11 |
|  | 1,2-Butanediol | 3 | 3 | 3 | 3 |
|  | Total (% by mass) | 100 | 100 | 100 | 100 |
|  | Resin solid content in clear ink (% by mass) | 7.5 | 9 | 9 | 12 |
|  | Glass transition temperature (Tg) of coating film of clear ink | 53° C. | 53° C. | 53° C. | 53° C. |

TABLE 1-2

|  |  | Production Example 5 Clear ink E | Production Example 6 Clear ink F | Production Example 7 Clear ink G |
|---|---|---|---|---|
| Resins | Resin emulsion 1 Polycarbonate-based urethane (water dispersible, solid content: 30% by mass, Tg: 53° C.) | 28.3 | 27 | 30 |
|  | Resin emulsion 2 Polyester-based urethane (water dispersible, solid content: 30% by mass, Tg: −4° C.) | 1.7 | 3 |  |
|  | Resin emulsion 3 Polycarbonate-based urethane (water dispersible, solid content: 30% by mass, Tg: 46° C.) |  |  |  |
| Water | Highly pure water | 33 | 33 | 32 |
| Surfactant | FS-300 (obtained from DuPont) (solid content: 40% by mass) | 6 | 6 | 6 |

TABLE 1-2-continued

|  |  | Production Example 5 Clear ink E | Production Example 6 Clear ink F | Production Example 7 Clear ink G |
|---|---|---|---|---|
| Organic solvents | 1,2-Propanediol | 17 | 17 | 18 |
|  | 1,3-Propanediol | 11 | 11 | 11 |
|  | 1,2-Butanediol | 3 | 3 | 3 |
| Total (% by mass) | | 100 | 100 | 100 |
| Resin solid content in clear ink (% by mass) | | 9 | 9 | 9 |
| Glass transition temperature (Tg) of coating film of clear ink | | 52° C., −3° C. | 52° C., −3° C. | 44° C. |

Production Example 1 of Magenta Ink

<Preparation of Self-Dispersible Magenta Pigment Dispersion>

After a mixture having the following formulation was premixed, the resultant mixture was circulated and dispersed by a disk-type bead mill (obtained from SHINMARU ENTERPRISES CORPORATION, KDL-type, media: use of zirconia balls having a diameter of 0.3 mm) for 7 hours, to thereby obtain a self-dispersible magenta pigment dispersion (pigment solid content concentration: 15% by mass).

Pigment Red 122 (product name: Toner Magenta EO02, obtained from Clariant Japan K.K.): 15 parts by mass Anionic surfactant (product name: Pionin A-51-B, obtained from TAKEMOTO OIL & FAT Co., Ltd.): 2 parts by mass Ion-exchanged water: 83 parts by mass <Production of Magenta Ink>

The polyurethane resin emulsion 1 (25% by mass) (solid content concentration: 30% by mass) of Preparation Example 1, the self-dispersible magenta pigment dispersion (20% by mass) (pigment solid content concentration: 15% by mass), 1,2-propanediol (20% by mass), 1,3-propanediol (11% by mass), 1,2-butanediol (3% by mass), the product name: FS-300 (6% by mass) (fluorosurfactant, obtained from E.I. du Pont de Nemours & Company, solid content concentration: 40% by mass) as a surfactant, and ultra pure water (15% by mass) were added, followed by mixing and stirring, to thereby prepare a mixture.

The obtained mixture was filtered through a polypropylene filter having the average pore diameter of 0.2 μm (product name: Betafine polypropylene pleated filter PPG series, obtained from 3M), to thereby produce magenta ink 1.

Example 1

<Inkjet Printing>

An ink cartridge of a modified device of an inkjet printer GXe5500 (obtained from Ricoh Company Limited) was loaded with the clear ink A of Production Example 1 of clear ink, and the ink cartridge loaded with the ink was mounted in the modified device of the inkjet printer GXe5500 to perform inkjet printing.

A heater (temperature adjusting controller, model: MTCD, obtained from MISUMI Corporation) was disposed in the modified device of the inkjet printer GXe5500 in a manner that a print medium could be heated from a back surface thereof before printing, during printing, and after printing. As a result, printing could be performed on the print medium heated by the heater before printing and during printing, and the printed matter could be heated and dried by the heater after printing.

Printing was performed in the high gloss printing mode (second printing mode) and the low gloss printing mode (first printing mode) by changing the kind of print media, heating conditions, and images to be printed.

—Print Medium—

In the high gloss printing mode, synthetic paper VJFN160 (obtained from YUPO CORPORATION) (white polypropylene film, glossiness: 16 (60° gloss value)) was used as print medium 1.

In the low gloss printing mode, a window film GIY-0305 (obtained from LINTEC SIGN SYSTEM, INC.) (transparent polyethylene terephthalate (PET) film, glossiness: 159 (60° gloss value)) was used as a print medium 2.

—Heating Conditions—

Regarding the heating conditions, the heating temperatures of each heater (heating unit) before printing, during printing, and after printing were set to 60° C., 60° C., and 70° C. in the high gloss printing mode. In the low gloss printing mode, the heating temperatures of each heater (heating unit) were set to 65° C., 65° C., and 70° C. When a temperature of the print medium during printing is measured, the print medium temperature ($=T_{gloss}$) in the high gloss printing mode is 59° C., the temperature ($=HT_{gloss}$ (° C.)) of the heating unit in the high gloss printing mode during printing is 60° C. When the temperature of the print medium during printing is measured, the print medium temperature ($=T_{matte}$) in the low gloss printing mode is 64° C., the temperature of the heating unit ($=HT_{matte}$ (° C.)) in the low gloss printing mode during printing is 65° C.

The temperature of the print medium during printing was measured using a digital radiation temperature sensor (FT-H10, obtained from KEYENCE CORPORATION).

An image printed in the high gloss printing mode was a full solid image that had an image resolution of 600 dpi×600 dpi and a printing rate of 100%.

An image printed in the low gloss printing mode was a halftone image that had an image resolution of 600 dpi×600 dpi and a printing rate of 40%.

—Printing Rate—

Note that, the printing rate means as follows.

Printing rate (%)=the number of printed dots of clear ink/(vertical resolution×horizontal resolution)×100

(in the formula above, "the number of printed dots of clear ink" is the number of dots per a unit area, which is obtained by actually printing the clear ink, and "vertical resolution" and "horizontal resolution" are each resolution per a unit area. In the case where the clear ink is overlapped and printed to form dots on the same position, "the number of printed dots of clear ink" represents the total number of dots per a unit area, which is obtained by actually printing the clear ink.)

In both the low gloss printing mode and the high printing mode, printing was performed in a manner that clear ink A was directly overlapped on the print medium on the same position to superimpose dots on the same position.

Next, glossiness of the obtained printed matter was measured in the following manner. The results are presented in Table 4.

<Glossiness>

A 60° gloss value of the clear ink printed area on which the clear ink A had been printed and a 60° gloss value of the cleat ink unprinted area (print medium) on which the clear ink A had not been printed were measured using a gloss meter (Micro-tri-gloss, obtained from BYK Japan KK). Note that, the 60° gloss value was determined as glossiness.

Example 2

Inkjet printing was performed in the same manner as in Example 1 except that the image printed in the high gloss printing mode was changed to a halftone image having an image resolution of 600 dpi×600 dpi and a printing rate of 80%; and the image printed in the low gloss printing mode was changed to a halftone image having an image resolution of 600 dpi×600 dpi and a printing rate of 70%.

The obtained printed matter was measured for glossiness in the same manner as in Example 1. Results are presented in Table 4.

Example 3

Inkjet printing was performed in the same manner as in Example 1 except that the heating temperatures of each heater before printing, during printing, and after printing were set to 50° C., 50° C., and 70° C. in the high gloss printing mode; and the heating temperatures of each heater were set to 70° C., 70° C., and 70° C. in the low gloss printing mode. The obtained printed matter was measured for glossiness in the same manner as in Example 1. Results are presented in Table 4.

When a temperature of the print medium during printing is measured, the print medium temperature (=$T_{gloss}$) in the high gloss printing mode is 49° C., the temperature (=$HT_{gloss}$ (° C.)) of the heating unit in the high gloss printing mode during printing is 50° C. When the temperature of the print medium during printing is measured, the print medium temperature (=$T_{matte}$) in the low gloss printing mode is 68° C., the temperature of the heating unit (=$HT_{matte}$ (° C.)) in the low gloss printing mode during printing is 70° C.

Example 4

Inkjet printing was performed in the same manner as in Example 3 except that the clear ink A of the Production Example 1 of clear ink was changed to the clear ink B of Production Example 2 of clear ink.

The obtained printed matter was measured for glossiness in the same manner as in Example 1. Results are presented in Table 4.

Example 5

Inkjet printing was performed in the same manner as in Example 3 except that the clear ink A of the Production Example 1 of clear ink was changed to the clear ink C of Production Example 3 of clear ink.

The obtained printed matter was measured for glossiness in the same manner as in Example 1. Results are presented in Table 4.

Example 6

Inkjet printing was performed in the same manner as in Example 3 except that the clear ink A of the Production Example 1 of clear ink was changed to the clear ink D of Production Example 4 of clear ink.

The obtained printed matter was measured for glossiness in the same manner as in Example 1. Results are presented in Table 4.

Example 7

Inkjet printing was performed in the same manner as in Example 3 except that the clear ink A of the Production Example 1 of clear ink was changed to the clear ink E of Production Example 5 of clear ink.

The obtained printed matter was measured for glossiness in the same manner as in Example 1. Results are presented in Table 4.

Example 8

Inkjet printing was performed in the same manner as in Example 3 except that the clear ink A of the Production Example 1 of clear ink was changed to the clear ink F of Production Example 6 of clear ink.

The obtained printed matter was measured for glossiness in the same manner as in Example 1. Results are presented in Table 4.

Example 9

Inkjet printing was performed in the same manner as in Example 6 except that a print medium printed using the magenta ink 1 of the Production Example 1 of magenta ink was used. That is, the clear ink D was printed on the coating film on which the magenta ink was printed.

As the magenta ink printed on the print medium, the magenta ink 1 of the Production Example 1 of magenta ink was used. The magenta ink 1 was printed by the same printing apparatus as in the clear ink D. Only the magenta ink was printed on a print medium. At this time, heating temperatures of each heater for the magenta ink coating film used in the high gloss printing mode before printing, during printing, and after printing were set to 50° C., 50° C., and 70° C., and heating temperatures of each heater for the magenta ink coating film used in the low gloss printing mode were set to 70° C., 70° C., and 70° C. All of the magenta printed images were fill solid images having an image resolution of 600 dpi×600 dpi and a printing rate of 100%.

Using the printing apparatus, the clear ink D was printed again on the print medium on which the magenta ink coating film had been printed.

The obtained printed matter was measured for glossiness in the same manner as in Example 1. Results are presented in Table 4.

Example 10

<Inkjet Printing>

An ink cartridge of a modified device of an inkjet printer GXe5500 (obtained from Ricoh Company Limited) was loaded with the clear ink A of Production Example 1, and the ink cartridge loaded with the ink was mounted in the modified device of the inkjet printer GXe5500 to perform inkjet printing.

A heater (temperature adjusting controller, model: MTCD, obtained from MISUMI Corporation) was disposed in the modified device of the inkjet printer GXe5500 in a manner that a print medium could be heated from a back surface thereof before printing, during printing, and after printing. As a result, printing could be performed on the print medium heated by the heater before printing and during printing, and the printed matter could be heated and dried by the heater after printing.

—Heating Conditions—

Regarding the heating conditions, the heating temperatures of each heater (heating unit) before printing, during printing, and after printing were set to 50° C., 50° C., and 70° C. in the high gloss printing mode. The print medium temperature ($=T_{gloss}$) was 49° C., and the temperature of the heating unit ($=HT_{gloss}$(° C.)) during printing was 50° C.

The temperature of the print medium during printing was measured using a digital radiation temperature sensor (FT-H10, obtained from KEYENCE CORPORATION). A full solid image that had an image resolution of 600 dpi×600 dpi and a printing rate of 100% was obtained.

The heating temperatures of each heater in the low gloss printing mode were set to 70° C., 70° C., and 70° C.

An image printed in the low gloss printing mode was a halftone image that had an image resolution of 600 dpi×600 dpi and a printing rate of 40%.

—Print Medium—

In the high gloss printing mode, synthetic paper VJFN160 (obtained from YUPO CORPORATION) (white polypropylene film, glossiness: 16 (60° gloss value)) was used as a print medium. The magenta ink 1 of the Production Example 1 of magenta ink was previously printed on the print medium, and the clear ink A was printed on the coating film on which the magenta ink had been printed. The magenta ink 1 was printed by the same printing apparatus as in the clear ink A. The heating temperatures of each heater before printing, during printing, and after printing were set to 50° C., 50° C., and 70° C., and the magenta ink 1 was printed on the print medium. All of the magenta printed images were fill solid images having an image resolution of 600 dpi×600 dpi and a printing rate of 100%.

Using the printing apparatus, the clear ink A was printed again on the print medium on which the magenta ink coating film had been printed.

The obtained printed matter was measured for glossiness in the same manner as in Example 1. Results are presented in Table 4.

In the low gloss printing mode, a window film GIY-0305 (obtained from LINTEC SIGN SYSTEM, INC.) (transparent polyethylene terephthalate (PET) film, glossiness: 159 (60° gloss value)) was used as a print medium.

The magenta ink 1 of the Production Example 1 of magenta ink was previously printed on the print medium, and the clear ink A was printed on the coating film on which the magenta ink had been printed. The magenta ink 1 was printed by the same printing apparatus as in the clear ink A. The heating temperatures of each heater before printing, during printing, and after printing were set to 70° C., 70° C., and 70° C., and the magenta ink 1 was printed on the print medium. All of the magenta printed images were fill solid images having an image resolution of 600 dpi×600 dpi and a printing rate of 100%.

Using the printing apparatus, the clear ink A was printed again on the print medium on which the magenta ink coating film had been printed.

The obtained printed matter was measured for glossiness in the same manner as in Example 1. Results are presented in Table 4.

Next, the printed matters obtained in the high gloss printing mode and the low gloss printing mode were subjected the abrasion resistance test in the following manner. Results are presented in Table 5.

<Abrasion Resistance Test>

Each printed matter was subjected to the abrasion resistance test in the following manner. Specifically, each printed matter was set on a color fastness rubbing tester (friction tester type II) (apparatus name: rubbing fastness tester for dyed matters AR-2 (BC), obtained from INTEC CO., LTD). On a contact part, a friction element (load: 500 g), to which a white cotton cloth (according to the JIS L 0803, white cloth attached for dyeing fastness test, Kanakin No. 3) was attached, was rubbed 500 times and 1,000 times back and forth. The coating film after the test was visually confirmed, and was evaluated for ranking. Note that, Rank 3, Rank 4, and Rank 5 in the rubbing of 500 times back and forth test were considered as "acceptance".

[Evaluation Criteria]

Rank 5: No mark caused through rubbing was found.

Rank 4: A slight mark caused through rubbing was found when looking at the coating film thoroughly and closely.

Rank 3: A change in color and a change in gloss in the rubbed portion were found when looking at the coating film closely.

Rank 2: A change in color and a change in gloss in the rubbed portion were found even when looking at the coating film from a distance.

Rank 1: The ground part of the medium was partially exposed.

Example 11

Inkjet printing was performed in the same manner as in Example 10 except that the clear ink A was changed to the clear ink B.

The obtained printed matter was measured for glossiness in the same manner as in Example 1. Results are presented in Table 4.

The abrasion resistance test was performed in the same manner as in Example 10. Results are presented in Table 5.

Example 12

Inkjet printing was performed in the same manner as in Example 10 except that the clear ink A was changed to the clear ink C.

The obtained printed matter was measured for glossiness in the same manner as in Example 1. Results are presented in Table 4.

The abrasion resistance test was performed in the same manner as in Example 10. Results are presented in Table 5.

Example 13

Inkjet printing was performed in the same manner as in Example 10 except that the clear ink A was changed to the clear ink D.

The obtained printed matter was measured for glossiness in the same manner as in Example 1. Results are presented in Table 4.

The abrasion resistance test was performed in the same manner as in Example 10. Results are presented in Table 5.

Example 14

Inkjet printing was performed in the same manner as in Example 10 except that the clear ink A was changed to the clear ink E.

The obtained printed matter was measured for glossiness in the same manner as in Example 1. Results are presented in Table 4.

The abrasion resistance test was performed in the same manner as in Example 10. Results are presented in Table 5.

Example 15

Inkjet printing was performed in the same manner as in Example 10 except that the clear ink A was changed to the clear ink F.

The obtained printed matter was measured for glossiness in the same manner as in Example 1. Results are presented in Table 4.

The abrasion resistance test was performed in the same manner as in Example 10. Results are presented in Table 5.

Comparative Example 1

Inkjet printing was performed in the same manner as in Example 2 except that the setting temperatures of the heater in the high gloss printing mode were set to the same setting temperatures of the heater in the low gloss printing mode: 65° C., 65° C., and 70° C. The obtained printed matter was measured for glossiness in the same manner as in Example 1. Results are presented in Table 4.

When the print medium temperature during printing was measured, the print medium temperature ($=T_{gloss}$) in the high gloss printing mode was 64° C., and the temperature ($=HT_{gloss}$ (° C.)) of the heating unit in the high gloss printing mode during printing was 65° C.

When the print medium temperature during printing was measured, the print medium temperature ($=T_{matte}$) in the low gloss printing mode was 64° C., and the temperature of the heating unit ($=HT_{matte}$ (° C.)) in the low gloss printing mode during printing was 65° C.

Comparative Example 2

Inkjet printing was performed in the same manner as in Example 1 except that the setting temperatures of the heater in the high gloss printing mode were set to the same setting temperatures of the heater in the low gloss printing mode: 65° C., 65° C., and 70° C.

The obtained printed matter was measured for glossiness in the same manner as in Example 1. Results are presented in Table 4.

When the print medium temperature during printing was measured, the print medium temperature ($=T_{gloss}$) in the high gloss printing mode was 64° C., and the temperature ($=HT_{gloss}$ (° C.)) of the heating unit in the high gloss printing mode during printing was 65° C. When the print medium temperature during printing was measured, the print medium temperature ($=T_{matte}$) in the low gloss printing mode was 64° C., and the temperature of the heating unit ($=HT_{matte}$ (° C.)) in the low gloss printing mode during printing was 65° C.

Comparative Example 3

The magenta ink of the Production Example 1 of magenta ink was printed on a print medium. The magenta ink was printed using the same printing apparatus as in the clear ink. The inkjet printing was performed. At this time, the heating temperatures of each heater for the magenta ink coating film before printing, during printing, and after printing were set to 50° C., 50° C., and 70° C. in the high gloss printing mode; and the heating temperatures of each heater for the magenta ink coating film used in the low gloss printing mode were set to 70° C., 70° C., and 70° C.

The obtained printed matter was measured for glossiness in the same manner as in Example 1. Results are presented in Table 4.

All of the printed images of magenta were full solid images having an image resolution of 600 dpi×600 dpi and a printing rate of 100%.

The glossiness of the part of the magenta ink coating film obtained in the high gloss printing mode was 31 (the glossiness of the ground part of the medium=16), and the glossiness of the part of the magenta ink coating film obtained in the low gloss printing mode was 104 (the glossiness of the ground part of the medium=159).

Comparative Example 4

Inkjet printing was performed in the same manner as in Comparative Example 2 except that the setting temperatures of the heater in the low gloss printing mode were set to 60° C., 60° C., and 70° C.

The obtained printed matter was measured for glossiness in the same manner as in Example 1. Results are presented in Table 4.

Comparative Example 5

Inkjet printing was performed in the same manner as in Example 10 except that the clear ink A was not printed and only the magenta ink 1 was used.

The obtained printed matter was measured for glossiness in the same manner as in Example 1. Results are presented in Table 4.

The abrasion resistance test was performed in the same manner as in Example 10. Results are presented in Table 5.

Comparative Example 6

Inkjet printing was performed in the same manner as in Example 10 except that the clear ink A was changed to the clear ink G.

The obtained printed matter was measured for glossiness in the same manner as in Example 1. Results are presented in Table 4.

The abrasion resistance test was performed in the same manner as in Example 10. Results are presented in Table 5.

TABLE 2-1

| | Printing conditions | | | | |
|---|---|---|---|---|---|
| | Inks | Printing modes | Media | Printing images | Print target of clear ink |
| Example 1 | Clear ink A | High gloss | VJFN160 | Full solid image | Print medium |
| | | Low gloss | GIY0305 | Halftone image | Print medium |
| Example 2 | Clear ink A | High gloss | VJFN160 | Halftone image | Print medium |
| | | Low gloss | GIY0305 | Halftone image | Print medium |
| Example 3 | Clear ink A | High gloss | VJFN160 | Full solid image | Print medium |
| | | Low gloss | GIY0305 | Halftone image | Print medium |
| Example 4 | Clear ink B | High gloss | VJFN160 | Full solid image | Print medium |
| | | Low gloss | GIY0305 | Halftone image | Print medium |
| Example 5 | Clear ink C | High gloss | VJFN160 | Full solid image | Print medium |
| | | Low gloss | GIY0305 | Halftone image | Print medium |
| Example 6 | Clear ink D | High gloss | VJFN160 | Full solid image | Print medium |
| | | Low gloss | GIY0305 | Halftone image | Print medium |
| Example 7 | Clear ink E | High gloss | VJFN160 | Full solid image | Print medium |
| | | Low gloss | GIY0305 | Halftone image | Print medium |
| Example 8 | Clear ink F | High gloss | VJFN160 | Full solid image | Print medium |
| | | Low gloss | GIY0305 | Halftone image | Print medium |
| Example 9 | Clear ink D + magenta ink | High gloss | VJFN160 | Full solid image | Magenta ink |
| | | Low gloss | GIY0305 | Halftone image | Magenta ink |
| Example 10 | Clear ink A + magenta ink | High gloss | VJFN160 | Full solid image | Magenta ink |
| | | Low gloss | GIY0305 | Halftone image | Magenta ink |
| Example 11 | Clear ink B + magenta ink | High gloss | VJFN160 | Full solid image | Magenta ink |
| | | Low gloss | GIY0305 | Halftone image | Magenta ink |
| Example 12 | Clear ink C + magenta ink | High gloss | VJFN160 | Full solid image | Magenta ink |
| | | Low gloss | GIY0305 | Halftone image | Magenta ink |
| Example 13 | Clear ink D + magenta ink | High gloss | VJFN160 | Full solid image | Magenta ink |
| | | Low gloss | GIY0305 | Halftone image | Magenta ink |
| Example 14 | Clear ink E + magenta ink | High gloss | VJFN160 | Full solid image | Magenta ink |
| | | Low gloss | GIY0305 | Halftone image | Magenta ink |
| Example 15 | Clear ink F+ magenta ink | High gloss | VJFN160 | Full solid image | Magenta ink |
| | | Low gloss | GIY0305 | Halftone image | Magenta ink |

TABLE 2-2

| | Printing conditions | | | | |
|---|---|---|---|---|---|
| | Inks | Printing modes | Media | Printing images | Print target of clear ink |
| Comparative Example 1 | Clear ink A | High gloss | VJFN160 | Halftone image | Print medium |
| | | Low gloss | GIY0305 | Halftone image | Print medium |
| Comparative Example 2 | Clear ink A | High gloss | VJFN160 | Halftone image | Print medium |
| | | Low gloss | GIY0305 | Halftone image | Print medium |
| Comparative Example 3 | Magenta ink | High gloss | VJFN160 | Full solid image | Not printed |
| | | Low gloss | GIY0305 | Full solid image | Not printed |
| Comparative Example 4 | Clear ink A | High gloss | VJFN160 | Full solid image | Print medium |
| | | Low gloss | GIY0305 | Halftone image | Print medium |
| Comparative Example 5 | Magenta ink | High gloss | VJFN160 | Full solid image | Not printed |
| | | Low gloss | GIY0305 | Full solid image | Not printed |
| Comparative Example 6 | Clear ink G + magenta ink | High gloss | VJFN160 | Full solid image | Magenta ink |
| | | Low gloss | GIY0305 | Halftone image | Magenta ink |

TABLE 3

| | Printing conditions | | | | |
|---|---|---|---|---|---|
| | | | Heater setting temperatures | | |
| | Printing rate | Number of clear inks repeatedly coated | Heater before printing | Heater of printed part ($HT_{gloss}$, $HT_{matte}$) | Heater after printing |
| Example 1 | 100% | Once | 60° C. | 60° C. | 70° C. |
| | 40% | Once | 65° C. | 65° C. | 70° C. |
| Example 2 | 80% | Once | 60° C. | 60° C. | 70° C. |
| | 70% | Once | 65° C. | 65° C. | 70° C. |
| Example 3 | 100% | Once | 50° C. | 50° C. | 70° C. |
| | 40% | Once | 70° C. | 70° C. | 70° C. |
| Example 4 | 100% | Once | 50° C. | 50° C. | 70° C. |
| | 40% | Once | 70° C. | 70° C. | 70° C. |
| Example 5 | 100% | Once | 50° C. | 50° C. | 70° C. |
| | 40% | Once | 70° C. | 70° C. | 70° C. |
| Example 6 | 100% | Once | 50° C. | 50° C. | 70° C. |
| | 40% | Once | 70° C. | 70° C. | 70° C. |

TABLE 3-continued

| | Printing conditions | | | | |
|---|---|---|---|---|---|
| | | | Heater setting temperatures | | |
| | Printing rate | Number of clear inks repeatedly coated | Heater before printing | Heater of printed part ($HT_{gloss}$, $HT_{matte}$) | Heater after printing |
| Example 7 | 100% | Once | 50° C. | 50° C. | 70° C. |
| | 40% | Once | 70° C. | 70° C. | 70° C. |
| Example 8 | 100% | Once | 50° C. | 50° C. | 70° C. |
| | 40% | Once | 70° C. | 70° C. | 70° C. |
| Example 9 | 100% | Once | 50° C. | 50° C. | 70° C. |
| | 40% | Once | 70° C. | 70° C. | 70° C. |
| Example 10 | 100% | Once | 50° C. | 50° C. | 70° C. |
| | 40% | Once | 70° C. | 70° C. | 70° C. |
| Example 11 | 100% | Once | 50° C. | 50° C. | 70° C. |
| | 40% | Once | 70° C. | 70° C. | 70° C. |
| Example 12 | 100% | Once | 50° C. | 50° C. | 70° C. |
| | 40% | Once | 70° C. | 70° C. | 70° C. |
| Example 13 | 100% | Once | 50° C. | 50° C. | 70° C. |
| | 40% | Once | 70° C. | 70° C. | 70° C. |
| Example 14 | 100% | Once | 50° C. | 50° C. | 70° C. |
| | 40% | Once | 70° C. | 70° C. | 70° C. |
| Example 15 | 100% | Once | 50° C. | 50° C. | 70° C. |
| | 40% | Once | 70° C. | 70° C. | 70° C. |
| Comparative Example 1 | 80% | Once | 65° C. | 65° C. | 70° C. |
| | 70% | Once | 65° C. | 65° C. | 70° C. |
| Comparative Example 2 | 100% | Once | 65° C. | 65° C. | 70° C. |
| | 40% | Once | 65° C. | 65° C. | 70° C. |
| Comparative Example 3 | 100% | — | 50° C. | 50° C. | 70° C. |
| | 100% | — | 70° C. | 70° C. | 70° C. |
| Comparative Example 4 | 100% | Once | 65° C. | 65° C. | 70° C. |
| | 40% | Once | 60° C. | 60° C. | 70° C. |
| Comparative Example 5 | 100% | — | 50° C. | 50° C. | 70° C. |
| | 100% | — | 70° C. | 70° C. | 70° C. |
| Comparative Example 6 | 100% | Once | 50° C. | 50° C. | 70° C. |
| | 40% | Once | 70° C. | 70° C. | 70° C. |

TABLE 4

| | Measurement results | | | |
|---|---|---|---|---|
| | Print medium | Glossiness | | Difference in glossiness |
| | temperature during printing | Clear ink-printed part | Clear ink-non printed part | Printed part – non printed part |
| Example 1 | 59° C. | 59 | 16 | 43 |
| | 64° C. | 114 | 159 | –45 |
| Example 2 | 59° C. | 43 | 16 | 27 |
| | 64° C. | 132 | 159 | –27 |
| Example 3 | 49° C. | 67 | 16 | 51 |
| | 68° C. | 105 | 159 | –54 |
| Example 4 | 49° C. | 70 | 16 | 54 |
| | 68° C. | 98 | 159 | –61 |
| Example 5 | 49° C. | 69 | 16 | 53 |
| | 68° C. | 89 | 159 | –70 |
| Example 6 | 49° C. | 72 | 16 | 56 |
| | 68° C. | 80 | 159 | –79 |
| Example 7 | 49° C. | 68 | 16 | 52 |
| | 68° C. | 95 | 159 | –64 |
| Example 8 | 49° C. | 66 | 16 | 50 |
| | 68° C. | 93 | 159 | –66 |
| Example 9 | 49° C. | 87 | 31 | 56 |
| | 68° C. | 42 | 104 | –62 |
| Example 10 | 49° C. | 82 | 31 | 51 |
| | 68° C. | 65 | 104 | –39 |
| Example 11 | 49° C. | 85 | 31 | 54 |
| | 68° C. | 59 | 104 | –45 |
| Example 12 | 49° C. | 84 | 31 | 53 |
| | 68° C. | 50 | 104 | –54 |
| Example 13 | 49° C. | 87 | 31 | 56 |
| | 68° C. | 42 | 104 | –62 |
| Example 14 | 49° C. | 83 | 31 | 52 |
| | 68° C. | 56 | 104 | –48 |
| Example 15 | 49° C. | 81 | 31 | 50 |
| | 68° C. | 54 | 104 | –50 |
| Comparative Example 1 | 64° C. | 32 | 16 | 16 |
| | 64° C. | 144 | 159 | –15 |
| Comparative Example 2 | 64° C. | 37 | 16 | 21 |
| | 64° C. | 141 | 159 | –18 |
| Comparative Example 3 | 64° C. | — | — | — |
| | 64° C. | — | — | — |
| Comparative Example 4 | 64° C. | 37 | 16 | 21 |
| | 59° C. | 146 | 159 | –13 |
| Comparative Example 5 | 49° C. | — | — | — |
| | 68° C. | — | — | — |
| Comparative Example 6 | 49° C. | 78 | 31 | 47 |
| | 68° C. | 45 | 104 | –59 |

TABLE 5

| | | High gloss printing mode Abrasion resistance test Number of reciprocations in test | | Low gloss printing mode Abrasion resistance test Number of reciprocations in test | | Glass transition temperature (Tg) of dry film of clear ink |
|---|---|---|---|---|---|---|
| | Inks | 500 reciprocations | 1,000 reciprocations | 500 reciprocations | 1,000 reciprocations | |
| Example 10 | Clear ink A | Rank 4 | Rank 2 | Rank 4 | Rank 4 | 53° C. |
| Example 11 | Clear in B | Rank 4 | Rank 2 | Rank 4 | Rank 4 | 53° C. |
| Example 12 | Clear ink C | Rank 4 | Rank 2 | Rank 4 | Rank 4 | 53° C. |
| Example 13 | Clear ink D | Rank 4 | Rank 2 | Rank 4 | Rank 4 | 53° C. |
| Example 14 | Clear ink E | Rank 4 | Rank 3 | Rank 4 | Rank 4 | 52° C., –3° C. |
| Example 15 | Clear ink F | Rank 4 | Rank 3 | R,ank 4 | Rank 4 | 52° C., –3° C. |
| Comparative Example 5 | No clear ink | Rank 1 | Rank 1 | Rank 1 | Rank 1 | — |
| Comparative Example 6 | Clear ink G | Rank 2 | Rank 2 | Rank 4 | Rank 1 | 44° C. |

It was found from the results in Table 2-1, Table 2-2, Table 3, Table 4, and Table 5 that Examples 1 to 8 where $T_{matte} > T_{gloss}$ ($HT_{matte} > HT_{gloss}$) was satisfied exhibited a considerably decreased gloss in the low gloss printing mode and a considerably increased gloss in the high gloss printing mode, compared to Comparative Examples 1 and 2 where $T_{matte} = T_{gloss}$ ($HT_{matte} = HT_{gloss}$) was satisfied and Comparative Example 4 where $T_{matte} < T_{gloss}$ ($HT_{matte} < HT_{gloss}$) was satisfied.

In comparison between Example 1 and Example 2, it was found that Example 1 where $D_{gloss} - D_{matte}$ was 60% obtained a larger change in gloss than Example 2 where $D_{gloss} - D_{matte}$ was 10%.

In comparison among Example 3, Example 4, and Example 6, it was found that when an amount of the resin in the clear ink was higher, a change in gloss obtained by printing the clear ink became larger; and Example 4 and Example 6 where the amount of the resin in the clear ink was 8% by mass or more could obtain a larger change in gloss than Example 3 where the amount of the resin in the clear ink was less than 8% by mass.

In comparison between Example 4 and Example 5, it was found that Example 5 where an amount of the surfactant was 2% by mass or less could obtain a larger change in gloss in the low gloss printing mode than Example 4 where the amount of the surfactant was more than 2% by mass.

In comparison between Example 9 and Comparative Example 3, it was found that Example 9 where the clear ink was printed on the magenta ink coating film exhibited low gloss in the low gloss printing mode and exhibited high gloss mode in the high gloss printing mode compared to Comparative Example 3 where only the magenta ink was printed.

From the results in Table 5, in comparison between Examples 10 to 15 and Comparative Examples 5 and 6, it was found that Examples 10 to 15, in which the dry film of the clear ink having a glass transition temperature (Tg) of 50° C. or more was used, exhibited more excellent abrasion resistance compared to Comparative Examples 5 and 6 when the clear ink was coated on the color ink.

Aspects of the present disclosure are as follows, for example.

<1> An inkjet printing apparatus including:
an ink accommodating unit storing an ink;
an ejection head configured to eject the ink to form a print layer; and
a heating unit configured to heat a print target,
wherein the ink is a clear ink including a resin and water,
a dry film of the clear ink has a glass transition temperature of 50° C. or more,
the inkjet printing apparatus has a first printing mode and a second printing mode, and
the heating unit is configured to heat the print target so that an expression: $T_{matte} > T_{gloss}$ is satisfied, where the $T_{matte}$ is a temperature (° C.) of the print target in a printing region printed in the first printing mode when the clear ink is deposited on the print target, and the $T_{gloss}$ is a temperature (° C.) of the print target in a printing region printed in the second printing mode obtained when the clear ink is deposited on the print target.

<2> The inkjet printing apparatus according to <1>,
wherein the dry film of the clear ink has a glass transition temperature of 50° C. or more and a glass transition temperature of less than 0° C.

<3> The inkjet printing apparatus according to <1> or <2>,
wherein the clear ink includes a resin particle A and a resin particle B,
the resin particle A has a glass transition temperature of 50° C. or more, and
the resin particle B has a glass transition temperature of less than 0° C.

<4> The inkjet printing apparatus according to any one of <1> to <3>,
wherein the heating unit is configured to heat the print target so that an expression: $T_{matte} - T_{gloss} \geq 10°$ C. is satisfied.

<5> An inkjet printing apparatus including:
an ink accommodating unit storing an ink;
an ejection head configured to eject the ink to form a print layer; and
a heating unit configured to heat a print target,
wherein the ink is a clear ink including a resin and water,
a dry film of the clear ink has a glass transition temperature of 50° C. or more,
the inkjet printing apparatus has a first printing mode and a second printing mode, and
the heating unit is configured to heat the print target so that an expression: $HT_{matte} > HT_{gloss}$ is satisfied, where the $HT_{matte}$ is a temperature (° C.) of the heating unit in the first printing mode, and the $HT_{gloss}$ is a temperature (° C.) of the heating unit in the second printing mode.

<6> The inkjet printing apparatus according to any one of <1> to <5>,
wherein an expression: $G_{matte} > G_{gloss}$ is satisfied, where the $G_{matte}$ is glossiness of the print target used in the low gloss printing mode, and the $G_{gloss}$ is glossiness of the print target used in the high gloss printing mode.

<7> The inkjet printing apparatus according to any one of <1> to <6>,
wherein an amount of the resin in the clear ink is 8% by mass or more.

<8> The inkjet printing apparatus according to any one of <1> to <7>,
wherein the resin is a polyurethane resin.

<9> An inkjet printing method including:
ejecting an ink on a print target to form a print layer; and
heating the print target printed,
wherein the ink is a clear ink including a resin and water,
a dry film of the clear ink has a glass transition temperature of 50° C. or more,
the inkjet printing method has a first printing mode and a second printing mode, and
in the heating, the print target printed is heated so that an expression: $T_{matte} > T_{gloss}$ is satisfied, where the $T_{matte}$ is a temperature (° C.) of the print target in a printing region printed in the first printing mode when the clear ink is deposited on the print target, and the $T_{gloss}$ is a temperature (° C.) of the print target in a printing region printed in the second printing mode when the clear ink is deposited on the print target.

<10> An inkjet printing method including:
ejecting the ink on a print target to form a print layer; and
heating the print target printed using a heating unit,
wherein the ink is a clear ink including a resin and water,
a dry film of the clear ink has a glass transition temperature of 50° C. or more,
the inkjet printing method has a first printing mode and a second printing mode, and
an expression: $HT_{matte} > HT_{gloss}$ is satisfied, where the $HT_{matte}$ is a temperature (° C.) of the heating unit in the first printing mode, and the $HT_{gloss}$ (° C.) is a temperature (° C.) of the heating unit in the second printing mode.

<11> The inkjet printing method according to <10>,
wherein the dry film of the clear ink has a glass transition temperature of 50° C. or more and a glass transition temperature of less than 0° C.

<12> The inkjet printing method according to <10> or <11>,
wherein the clear ink includes a resin particle A and a resin particle B,
the resin particle A has a glass transition temperature of 50° C. or more, and
the resin particle B has a glass transition temperature of less than 0° C.

<13> A method for controlling glossiness of a print image, the method including:
ejecting an ink on a print target to form a print layer; and
heating the print target printed,
wherein the ink is a clear ink including a resin and water,
a dry film of the clear ink has a glass transition temperature of 50° C. or more,
the method for controlling the glossiness of the print image has a first printing mode and a second printing mode, when printing is performed in the first printing mode, control of increasing a heating temperature is performed, and when printing is performed in the second printing mode, control of decreasing the heating temperature is performed.

<14> A printed matter including:
a print target; and
a print layer on the print target,
wherein the print layer is formed of a dry film of a clear ink including a resin,
the dry film of the clear ink has a glass transition temperature of 50° C. or more,
the printed matter includes a first printed image printed in a first printing mode and a second printed image printed in a second printing mode,
a difference in glossiness (Ga−Gb) is 20 or more, where the Ga is a 60° glossiness of the second printed image, and the Gb is a 60° glossiness of the print target used in the second printing mode,
a difference in glossiness (Gc−Gd) is −20 or less, where the Gc is a 60° glossiness of the first printed image, and the Gd is a 60° glossiness of the print target used in the first printing mode.

The inkjet printing apparatus according to any one of <1> to <8>, the inkjet printing method according to any one of <9> to <12>, the method for controlling glossiness of a print image according to <13>, and the printed matter according to <14> can solve the conventionally existing problems in the art and can achieve the object of the present disclosure.

What is claimed is:

1. An inkjet printing apparatus, comprising:
   an ink accommodating unit storing an ink;
   an ejection head configured to eject the ink to form a print layer; and
   a heating unit configured to heat a print target,
   wherein the ink is a clear ink comprising a resin and water,
   a dry film of the clear ink has a glass transition temperature of 50° C. or more,
   the inkjet printing apparatus has a first printing mode and a second printing mode, and
   the heating unit is configured to heat the print target so that an expression: $T_{matte} > T_{gloss}$ is satisfied, where the $T_{matte}$ is a temperature (° C.) of the print target in a printing region printed in the first printing mode when the clear ink is deposited on the print target, and the $T_{gloss}$ is a temperature (° C.) of the print target in a printing region printed in the second printing mode when the clear ink is deposited on the print target.

2. The inkjet printing apparatus according to claim 1, wherein the dry film of the clear ink has a glass transition temperature of 50° C. or more and a glass transition temperature of less than 0° C.

3. The inkjet printing apparatus according to claim 1, wherein the clear ink comprises a resin particle A and a resin particle B,
   the resin particle A has a glass transition temperature of 50° C. or more, and
   the resin particle B has a glass transition temperature of less than 0° C.

4. The inkjet printing apparatus according to claim 1, wherein the heating unit is configured to heat the print target so that an expression: $T_{matte} - T_{gloss} \geq 10°$ C. is satisfied.

5. The inkjet printing apparatus according to claim 1, wherein the heating unit is configured to heat the print target so that an expression: $HT_{matte} > HT_{gloss}$ is satisfied, where the $HT_{matte}$ is a temperature (° C.) of the heating unit in the first printing mode, and the $HT_{gloss}$ is a temperature (° C.) of the heating unit in the second printing mode.

6. The inkjet printing apparatus according to claim 1, wherein an expression: $G_{matte} > G_{gloss}$ is satisfied, where the $G_{matte}$ is glossiness of the print target used in the first printing mode, and the $G_{gloss}$ is glossiness of the print target used in the second printing mode.

7. The inkjet printing apparatus according to claim 1, wherein an amount of the resin in the clear ink is 8% by mass or more.

8. The inkjet printing apparatus according to claim 1, wherein the resin is a polyurethane resin.

9. An inkjet printing method, comprising:
   ejecting an ink on a print target to form a print layer; and
   heating the print target printed,
   wherein the ink is a clear ink comprising a resin and water,
   a dry film of the clear ink has a glass transition temperature of 50° C. or more,
   the inkjet printing method has a first printing mode and a second printing mode, and
   in the heating, the print target printed is heated so that an expression: $T_{matte} > T_{gloss}$ is satisfied, where the $T_{matte}$ is a temperature (° C.) of the print target in a printing region printed in the first printing mode obtained when the clear ink is deposited on the print target, and the $T_{gloss}$ is a temperature (° C.) of the print target in a printing region printed in the second printing mode obtained when the clear ink is deposited on the print target.

10. The inkjet printing method according to claim 9, wherein an expression: $HT_{matte} > HT_{gloss}$ is satisfied, where the $HT_{matte}$ is a temperature (° C.) of the heating unit in the first printing mode, and the $HT_{gloss}$ (° C.) is a temperature (° C.) of the heating unit in the second printing mode.

11. A method for controlling glossiness of a print image, the method comprising:
    ejecting an ink on a print target to form a print layer; and
    heating the print target printed,
    wherein the ink is a clear ink comprising a resin and water,
    a dry film of the clear ink has a glass transition temperature of 50° C. or more,
    the method for controlling the glossiness of the print image has a first printing mode and a second printing mode,
    when printing is performed in the first printing mode, control of increasing a heating temperature is performed, and
    when printing is performed in the second printing mode, control of decreasing the heating temperature is performed.

* * * * *